(12) United States Patent
Fujitsu

(10) Patent No.: US 12,248,092 B2
(45) Date of Patent: Mar. 11, 2025

(54) RADAR DEVICE

(71) Applicant: DENSO CORPORATION, Kariya (JP)

(72) Inventor: Seiya Fujitsu, Kariya (JP)

(73) Assignee: DENSO CORPORATION, Kariya (JP)

( * ) Notice: Subject to any disclaimer, the term of this patent is extended or adjusted under 35 U.S.C. 154(b) by 470 days.

(21) Appl. No.: 17/496,264

(22) Filed: Oct. 7, 2021

(65) Prior Publication Data

US 2022/0026528 A1 Jan. 27, 2022

Related U.S. Application Data

(63) Continuation of application No. PCT/JP2020/016007, filed on Apr. 9, 2020.

(30) Foreign Application Priority Data

Apr. 10, 2019 (JP) .................. 2019-074875

(51) Int. Cl.
| | |
|---|---|
| *G01S 13/36* | (2006.01) |
| *G01S 7/35* | (2006.01) |
| *G01S 7/41* | (2006.01) |
| *G01S 13/89* | (2006.01) |
| *G06F 18/22* | (2023.01) |

(Continued)

(52) U.S. Cl.
CPC ............ *G01S 7/411* (2013.01); *G01S 7/354* (2013.01); *G01S 7/356* (2021.05); *G01S 13/36* (2013.01); *G01S 13/89* (2013.01); *G06F 18/22* (2023.01); *G06T 7/77* (2017.01); *G06V 10/255* (2022.01); *G06V 20/56* (2022.01); *G06T 2207/20076* (2013.01); *G06T 2207/30252* (2013.01); *G06V 2201/07* (2022.01)

(58) Field of Classification Search
CPC .......... G01S 7/411; G01S 7/354; G01S 7/356; G01S 13/36; G01S 13/89; G01S 13/347; G01S 13/345; G01S 13/931; G06F 18/22; G06F 2218/08; G06T 7/77; G06T 2207/20076; G06T 2207/30252; G06V 10/255; G06V 20/56; G06V 2201/07
USPC ......................................................... 342/127
See application file for complete search history.

(56) References Cited

U.S. PATENT DOCUMENTS

| | | | |
|---|---|---|---|
| 9,348,016 B2 * | 5/2016 | Asanuma | ............... G01S 13/723 |
| 2015/0355315 A1 * | 12/2015 | Shimizu | ............... G01S 13/42 |
| | | | 342/107 |

(Continued)

*Primary Examiner* — Vladimir Magloire
*Assistant Examiner* — Remash R Guyah
(74) *Attorney, Agent, or Firm* — Maschoff Brennan

(57) ABSTRACT

A feature quantity extraction unit extracts at least one type of feature quantity using at least one of information associated with an instantaneous value generated by an instantaneous value generation unit and information associated with a target object member generated by a connection determination unit. A virtual image determination unit calculate a virtual image probability from a virtual image distribution and a real image probability from a real image distribution for each target object member generated by the connection determination unit using an extraction result related to the target object member of the feature quantity extraction unit. The virtual image determination unit further determines whether or not the target object member is a virtual image according to a result of integrating the calculated virtual image probability and the calculated real image probability.

15 Claims, 20 Drawing Sheets

(51) Int. Cl.
  *G06K 9/00* (2022.01)
  *G06K 9/62* (2022.01)
  *G06T 7/77* (2017.01)
  *G06V 10/20* (2022.01)
  *G06V 20/56* (2022.01)

(56) References Cited

U.S. PATENT DOCUMENTS

| | | | |
|---|---|---|---|
| 2017/0102459 A1* | 4/2017 | Sakamoto | G01S 13/347 |
| 2017/0115386 A1 | 4/2017 | Morinaga et al. | |
| 2017/0161571 A1* | 6/2017 | Zhao | B60R 11/04 |
| 2019/0293776 A1* | 9/2019 | Yokoi | G01S 13/86 |
| 2021/0256260 A1* | 8/2021 | Kaneko | G01C 21/28 |

* cited by examiner

RADAR DEVICE

CROSS REFERENCE TO RELATED APPLICATIONS

The present application is a continuation application of International Patent Application No. PCT/JP2020/016007 filed on Apr. 9, 2020, which designated the U.S. and claims the benefit of priority from Japanese Patent Application No. 2019-074875 filed on Apr. 10, 2019. The entire disclosures of all of the above applications are incorporated herein by reference.

TECHNICAL FIELD

The present disclosure relates to a radar device mounted on a mobile body.

BACKGROUND

As a radar device mounted on a vehicle or the like, a method of calculating a distance by using a signal phase difference, in other words, a phase of a difference signal, such as a dual frequency CW (hereinafter, 2FCW), is known. The distance obtained by using the phase includes ambiguity due to a folding back of the phase (hereinafter, ambiguity). Specifically, when a detected phase is θ, an actual phase may be θ+2π·n (n is an integer), and this cannot be distinguished. That is, the distance at which the phase of the signal rotates once is a detection upper limit distance. A target located farther than the detection upper limit distance is erroneously detected as in a distance within the detection upper limit distance by the phase folding back.

SUMMARY

The present disclosure describes a radar device that suppresses erroneous detection due to ambiguity of a measurement result.

DETAILED DESCRIPTION

Figure 1:
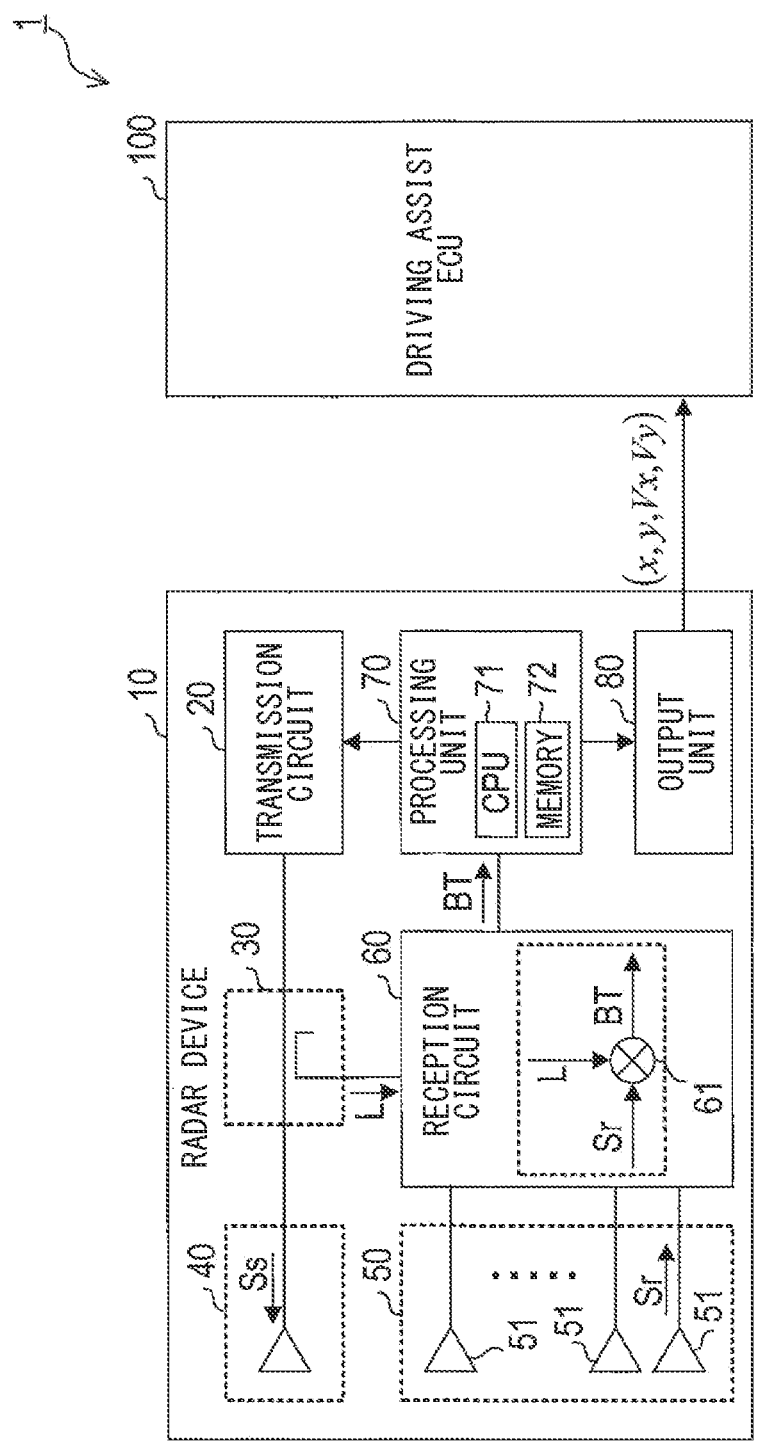
FIG. 1 is a block diagram showing a configuration of an in-vehicle system.

There is a radar device that uses both a radar method, which generates ambiguity, and an FMCW method, which does not generate ambiguity, in combination, and matches the detection results of the radar method and the FMCW method so as to obtain highly accurate measurement.

In such a radar device, as a result of detailed studies by the present inventor, it has been found that a prior technique causes the following drawbacks. That is, in an in-vehicle radar device that combines the FMCW method with the radar method such as 2FCW or FCM, which generates the ambiguity, by applying the prior technique, when matching the detection result in the 2FCW and the detection result in the FMCW method, detection results having similar indicators, such as direction or power, are matched with each other.

A reflected wave from a long-distance target that causes a distance folding back in the 2FCW usually has smaller power due to the diffusion of radio waves. Therefore, mismatching with the detection result in the FMCW is suppressed due to the difference in power.

However, in a space surrounded by a wall surface, such as in a tunnel, the reflected wave from the long-distance target is repeatedly reflected and propagated on the wall surface without being diffused, so that the reflected wave is received without being sufficiently attenuated. Moreover, in a straight tunnel, both the reflected wave from the ceiling located at a short distance and the reflected wave from a long-distance target come from positions almost directly behind, so both the reflected waves are detected in substantially the same direction.

Namely, the reflected wave from the long-distance target detected by the 2FCW, that is, the virtual image detected at a position closer to the actual position by the ambiguity and the reflected wave from the ceiling of the tunnel are similar in direction and power, and hence mismatching may occur. As a result, the position of the virtual image detected at a position closer than the actual position is erroneously detected as the position of the actual target, which causes a malfunction of the driving support control such as a false alarm.

In an aspect of the present disclosure, in regard to a radar device, a technique for suppressing erroneous detection based on the ambiguity of measurement results may be provided.

According to an aspect of the present disclosure, a radar device includes a spectrum generation unit, an instantaneous value generation unit, a connection determination unit, a feature quantity extraction unit, a distribution storage unit, and a virtual image determination unit. The spectrum generation unit generates at least one of a one-dimensional spectrum and a two-dimensional spectrum by using one or more types of modulation methods and analyzing a signal obtained by transmitting and receiving a modulated wave by each modulation method as a radar wave for every processing cycle. The instantaneous value generation unit generates one or more instantaneous values by extracting a peak from at least one of the one-dimensional spectrum and the two-dimensional spectrum generated for each modulation method. The connection determination unit generates and extinguishes a target object and a target object candidate by determining whether or not a target object and a target object candidate generated in a previous processing cycle or before have a historical connection with the instantaneous value generated by the instantaneous value generation unit. The feature quantity extraction unit extracts one or more types of feature quantities determined in advance by using at least one of information associated with the instantaneous value generated by the instantaneous value generation unit and information associated with the target object and the target object candidate, as target object members, generated by the connection determination unit. The distribution storage unit is stored with a virtual image distribution and a real image distribution generated in advance for each feature quantity. The virtual image determination unit calculate, using an extraction result of the feature quantity extraction unit relating to the target object members, a virtual image probability for each target object member generated by the connection determination unit from the virtual image distribution and a real image probability from the real image distribution. The virtual image determination unit further determines whether or not each target object member is a virtual image according to a result of integrating the virtual image probability and the real image probability calculated. The virtual image distribution is a distribution representing, when a feature quantity is given, a probability that an extraction source of the given feature quantity is a virtual image. The real image distribution is a distribution representing, when a feature quantity is given, a probability that an extraction source of the given feature quantity is a real image. As the feature quantity, one having the virtual image distribution and the real image distribution that are different in shape is used.

In such a configuration, whether or not the target object member is a virtual image is determined by using the feature quantity of the target object member and the feature quantity of the instantaneous value having a historical connection with the target object member. Therefore, it is possible to improve determination accuracy. As a result, it is less likely that a virtual image caused by ambiguity of the instantaneous value will be erroneously detected as a real image. Note that physical quantities associated with coordinate axes of the one-dimensional spectrum and the two-dimensional spectrum are different depending on the modulation method. The coordinate axis of the one-dimensional spectrum is associated, for example, with a relative speed in 2FCW, and with a distance and a relative speed in FMCW. The coordinate axes of the two-dimensional spectrum are associated with, for example, with a relative speed and a direction in the FMCW, and with a distance and a relative speed in FCM. FMCW is an abbreviation for Frequency Modulated Continuous Wave, and CW is an abbreviation for Continuous Wave. FCM is an abbreviation for Fast-Chirp Modulation. 2F of the 2FCW indicates dual frequencies.

Embodiments of the present disclosure will be described hereinafter with reference to the drawings.

1. First Embodiment

[1-1. Configuration]

As shown in FIG. 1, an in-vehicle system 1 includes a radar device 10 and a driving assist ECU 100. ECU is an abbreviation for Electronic Control Unit. The in-vehicle system 1 is mounted on a vehicle, such as a four-wheel automobile. The vehicle corresponds to a mobile body. The radar device 10 is attached to each of a rear end and left and right ends of the vehicle, for example. The radar device 10 is arranged so that the detection range of the radar device 10 includes a rear direction along the straight direction of the vehicle and a lateral direction orthogonal to the straight direction. The vehicle equipped with the radar device 10 is also referred to as the host vehicle.

The radar device 10 emits a radar wave, receives a reflected wave, and observes a distance R to a target object on which the radar wave is reflected, a speed V of the target object, and an orientation θ of the target object based on the received signal. The radar device 10 calculates estimation values of a lateral position x, a longitudinal position y, a lateral speed Vx, and a longitudinal speed Vy from these observed values (R, V, θ), and provides the estimation values (x, y, Vx, Vy) to the driving assist ECU 100. The lateral position x is a position along a width direction of the vehicle on which the in-vehicle system 1 is mounted, and the longitudinal position y is a position along the traveling direction of the vehicle.

The driving assist ECU 100 executes various processing for assisting the driver in driving the vehicle based on the estimation values (x, y, Vx, Vy) of each target object provided from the radar device 10. Examples of the processing related to the driving assist includes processing for issuing an alarm to notify the driver of that there is an approaching object, and processing for executing vehicle control for avoiding a collision with an approaching object, such as control of a braking system, a steering system, or the like.

The radar device 10 includes a transmission circuit 20, a distributor 30, a transmission antenna 40, a reception antenna 50, a reception circuit 60, a processing unit 70, and an output unit 80.

Figure 2:
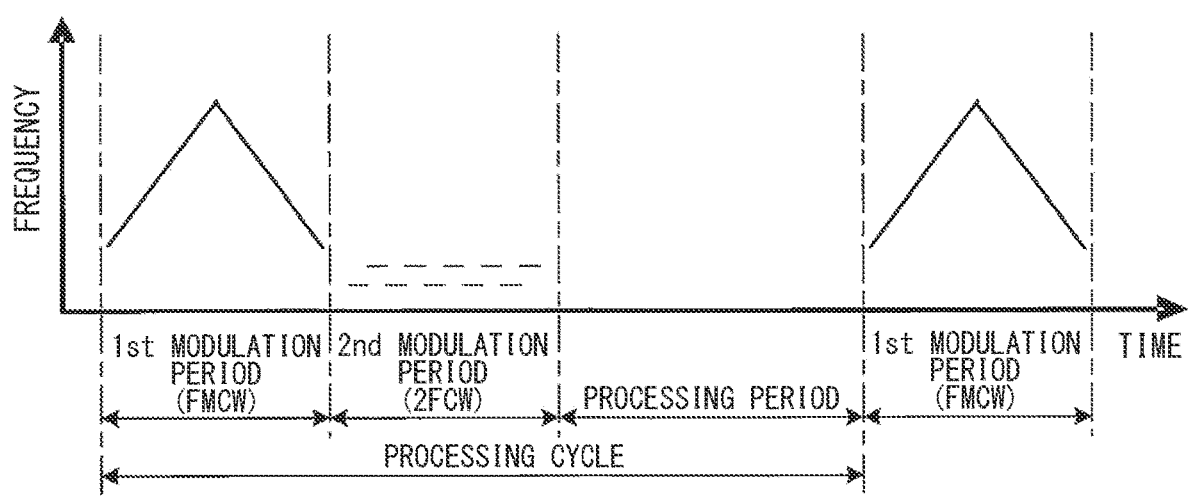
FIG. 2 is an explanatory diagram relating to a modulation method of a radar wave to be used.

The transmission circuit 20 is a circuit for supplying a transmission signal Ss to the transmission antenna 40. The transmission circuit 20 inputs a millimeter-wave-band high frequency signal to the distributor 30, which is located upstream of the transmission antenna 40. Specifically, as shown in FIG. 2, the transmission circuit 20 alternately repeats a first modulation period and a second modulation period in every preset processing cycle, and inputs a high frequency signal generated to the distributor 30. In the first modulation period, a high frequency signal a frequency of which is modulated to increase and decrease in a triangular wave shape is generated. In the second modulation period, a high frequency signal with alternating frequencies is generated. The processing cycle is set longer than the total period of the first modulation period and the second modulation period, and includes a processing period that is from the end of the second modulation period and to the start of the first modulation period of the next processing cycle.

That is, the radar device 10 operates as an FMCW radar that transmits and receives FMCW as a first modulation wave in the first modulation period, and operates as a 2FCW radar that transmits a dual frequency CW (hereinafter, 2FCW) as a second modulation wave in the second modulation period. The two frequencies used in the 2FCW are set so that the distance can be uniquely measured within a predetermined upper limit distance (for example, 150 m). Two signals having different frequencies used in the 2FCW are hereinafter referred to as a first signal and a second signal. Further, the waveform of the FMCW is set so that the distance can be uniquely specified in a range of a distance sufficiently longer than the upper limit distance.

Returning to FIG. 1, the distributor 30 performs power distribution of the high frequency signal received from the transmission circuit 20 into a transmission signal Ss and a local signal L.

The transmission antenna 40 emits a radar wave having a frequency corresponding to the transmission signal Ss based on the transmission signal Ss supplied from the distributor 30.

The receiving antenna 50 is an antenna for receiving a reflected wave, which is a radar wave reflected by a target object. The reception antenna 50 is configured as a linear array antenna in which a plurality of antenna elements 51 are arranged in a row. A reception signal Sr of the reflected wave received by each antenna element 51 is input to the reception circuit 60.

The reception circuit 60 processes the reception signal Sr received from each antenna element 51 of the reception antenna 50, generates a beat signal BT for each antenna element 51, and outputs the beat signal BT. Specifically, the reception circuit 60 mixes, using a mixer 61, the reception signal Sr received from the antenna element 51 and the local signal L received from the distributor 30 for each antenna element 51 to generate and output the beat signal BT for each antenna element 51.

The process of outputting the beat signal BT includes a process of amplifying the reception signal Sr, a process of removing unnecessary signal components from the beat signal BT, and a process of converting the beat signal BT into digital data. In this way, the receiving circuit 60 converts the beat signal BT generated for each antenna element 51 into digital data and outputs the beat signal BT as the digital data. The output beat signal BT for each antenna element 51 is input to the processing unit 70. Hereinafter, an A/D conversion data of the beat signal BT acquired in the first modulation period is referred to as the first modulation data, and an A/D conversion data of the beat signal BT acquired in the second modulation period is referred to as the second modulation data.

The processing unit 70 includes a microcomputer having a CPU 71 and a semiconductor memory (hereinafter, memory 72) such as RAM or ROM. Each function of the processing unit 70 is realized by the CPU 71 executing a program stored in a non-transitory tangible storage medium. In this example, the memory 72 corresponds to the non-transitory tangible storage medium storing a program. When the program is executed, a method corresponding to the program is executed. The processing unit 70 may include one microcomputer or a plurality of microcomputers. The processing unit 70 may include a coprocessor that executes a high-speed Fourier transform (hereinafter, FFT) processing or the like.

The processing unit 70 at least executes a target object detection processing for calculating an estimation value (x, y, Vx, Vy) for each target object that reflects radar waves by analyzing the beat signal BT of each antenna element 51.

The method for realizing the functions of each part included in the processing unit 70 is not limited to software, and some or all of the functions may be realized by using one or more hardware. For example, when the above-described functions may be implemented by an electronic circuit which is hardware, the electronic circuit may be implemented by a digital circuit, an analog circuit, or a combination thereof.

[1-2. Processing]
[1-2-1. Target Object Detection Processing]

Figure 3:
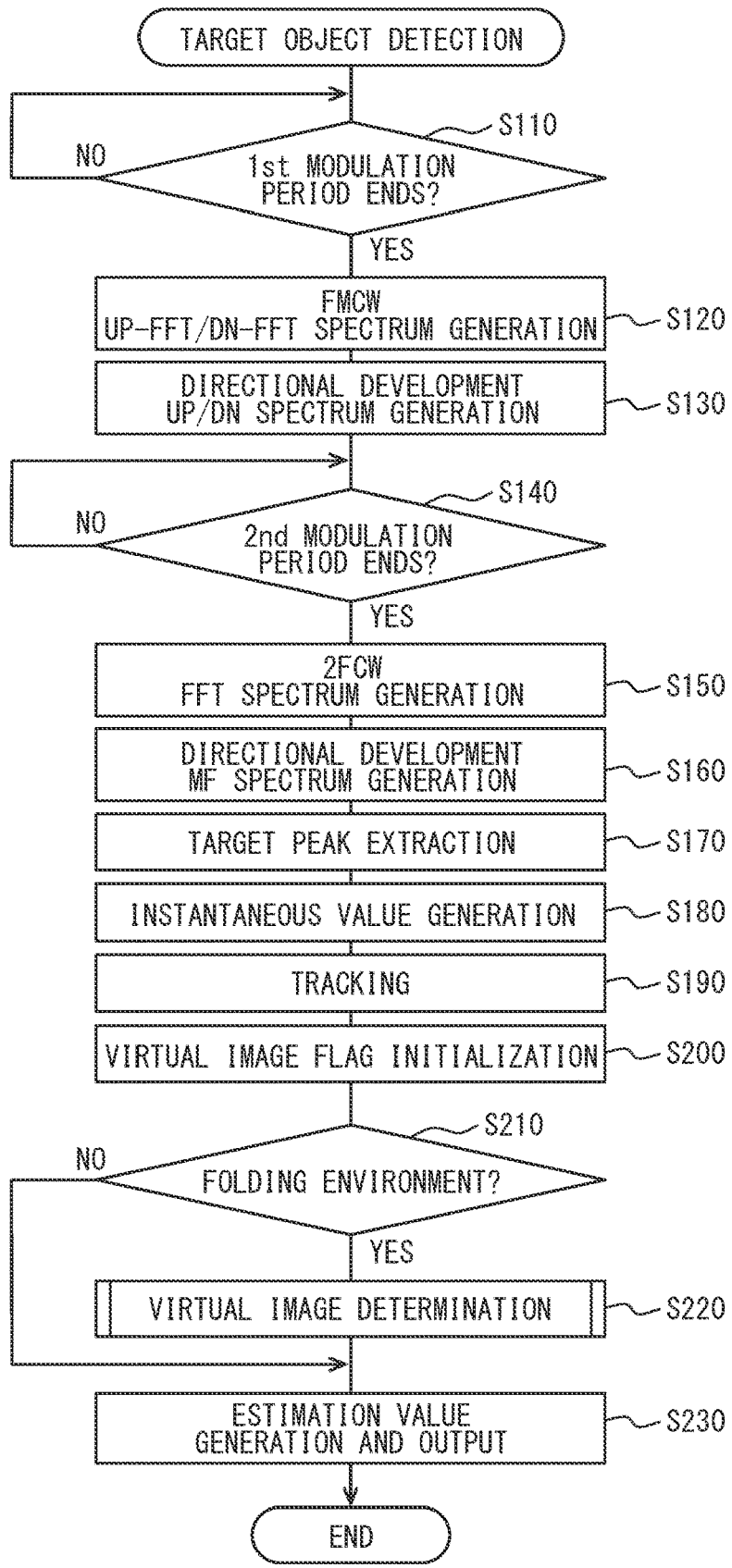
FIG. 3 is a flowchart of a target object detection process.

The target object detection processing executed by the processing unit 70 will be described with reference to the flowchart of FIG. 3.

The target object detection processing is repeatedly executed every processing cycle, when the in-vehicle system 1 is activated.

When the target object detection processing is activated, the processing unit 70 determines in S110 whether or not the first modulation period ends, that is, whether or not the acquisition of the first modulation data is completed. If the acquisition of the first modulation data is not completed, the processing unit 70 waits while repeating the same step. If the acquisition of the first modulation data is completed, the processing unit 70 shifts the processing to S120.

In S120, the processing unit 70 calculates a power spectrum by executing a frequency analysis processing of the first modulation data for each antenna element 51 and for each of the up chirp and the down chirp.

In this case, an FFT processing is executed as the frequency analysis processing. FFT is an abbreviation for Fast Fourier Transform. The power spectrum obtained by the FFT is called a FFT spectrum. In the FFT spectrum, the power of the reflected wave is represented for each frequency bin. The frequency bin is a frequency range that serves as a unit scale of the FFT spectrum, and is determined by the number of samples of data to be subjected to the FFT processing and the sampling frequency.

The up chirp is a signal whose frequency increases with time in the FMCW, and the down chirp is a signal whose frequency decreases with time in the FMCW. Hereinafter, the FFT spectrum of the up chirp is referred to as an UP-FFT spectrum and the FFT spectrum of the down chirp is referred to as a DN-FFT spectrum. These UP-FFT spectrum and DN-FFT spectrum correspond to a one-dimensional spectrum.

The processing unit 70 calculates an average FFT spectrum by averaging the FFT spectra obtained from each antenna element 51 for each of the UP-FFT spectrum and the DN-FFT spectrum. Further, the processing unit 70 extracts a frequency bin having a peak whose signal level is equal to or higher than a preset threshold value on the average FFT spectrum. In this case, the signal level may simply be a peak power or a peak power ratio to the noise floor. The same applies hereinafter.

In the following S130, the processing unit 70 executes a directional calculation of each of the UP-FFT spectrum and the DN-FFT spectrum calculated in S120.

In the directional calculation, a directional development is performed by utilizing the fact that the phases of the peaks detected at the same frequency bin of each channel are different for each channel. By the directional calculation, a two-dimensional spectrum having a frequency bin and a direction as coordinate axes is generated. A high resolution algorithm such as MUSIC may be used for the directional calculation. MUSIC is an abbreviation for Multiple Signal Classification. Alternatively, beamforming or the like may be used for the directional calculation. Further, the directional calculation is performed at least for all frequency bins whose peaks are detected on the FFT spectrum in S120. In the following, the two-dimensional spectrum of the up chirp is referred to as the UP spectrum, and the two-dimensional spectrum of the down chirp is referred to as the DN spectrum.

In the following S140, the processing unit 70 determines whether or not the second modulation period ends, that is, whether or not the acquisition of the second modulation data is completed. If the second modulation period does not end, the processing unit 70 waits while repeating the same step, and if the second modulation period ends, the processing unit 70 shifts the processing to S150.

In S150, the processing unit 70 generates a power spectrum by executing a frequency analysis processing of the second modulation data for each antenna element 51 and for each of the first signal and the second signal, and detects a peak on the power spectrum. In this case, as in S120, the FFT processing is used as the frequency analysis processing. The FFT spectrum obtained as a result of this FFT processing also corresponds to the one-dimensional spectrum.

Figure 4:
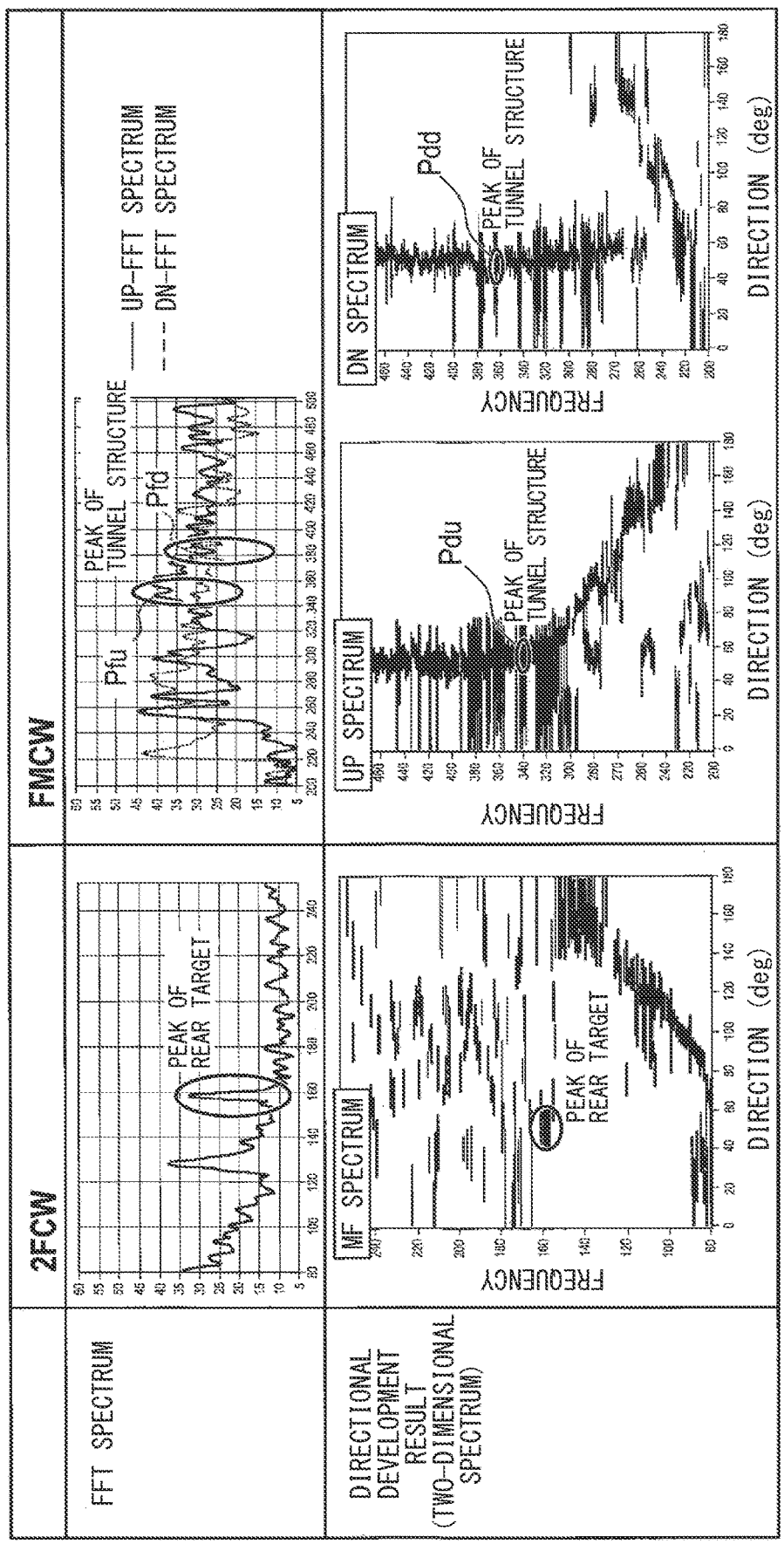
FIG. 4 is an explanatory diagram illustrating an FFT spectrum generated by a target object detection process and a direction-developed two-dimensional spectrum.

Since the frequencies of the first signal and the second signal in the 2FCW are sufficiently close to each other, a Doppler frequency detected from the first signal and a Doppler frequency detected from the second signal have substantially the same magnitude. That is, on the FFT spectrum of the first signal and the FFT spectrum of the second signal, peaks are detected at the same frequency bin. That is, since the FFT spectrum of the first signal and the FFT spectrum of the second signal have the same shape, only one FFT spectrum is shown in FIG. 4

Then, for each of the first signal and the second signal, an average FFT spectrum is calculated by averaging the FFT spectra obtained from each antenna element 51, and a frequency bin having a peak whose power being equal to or higher than a preset threshold value is extracted.

Further, the distance is calculated from a phase difference $\Delta\theta$ of two peak frequency components detected at the same frequency bin from the two average FFT spectra. However, since it is not possible to distinguish whether the actual phase difference is $\Delta\theta$ or $2n\pi+\Delta\theta$, the distance calculated from the phase difference $\Delta\theta$ includes ambiguity due to the phase folding (hereinafter, ambiguity). n is an integer.

In the following S160, the processing unit 70 executes the directional calculation by using the FFT spectrum (hereinafter, MF-FFT spectrum) of either the first signal or the second signal, in the similar manner to S130. The two-dimensional spectrum generated by this directional calculation is called an MF spectrum. The directional calculation is performed at least for all frequency bins whose peaks are detected on the MF-FFT spectrum in S150.

In the following S170, the processing unit 70 extracts all peaks having the power equal to or higher than a preset threshold value, on the UP spectrum and the DN spectrum generated in S130 and the MF spectrum generated in S160.

In the following S180, the processing unit 70 performs peak matching to associate peaks presumed to be based on the same target object with each other, among the peaks extracted in S170, thereby to generate an instantaneous value of this processing cycle.

The peaks based on the same reflection point extracted from the UP spectrum and the DN spectrum are detected in the same direction, and the frequency bin at which the peak is detected changes according to the relative speed between the reflection point and the host vehicle.

Specifically, when the relative speed between the reflection point and the host vehicle is zero, the frequency bin at which the peak is detected is the same between the UP spectrum and the DN spectrum. In a case where the reflection point is approaching the host vehicle, the frequency bin at which the peak is detected is lower in the UP spectrum than in the DN spectrum. In a case where the reflection point is separating from the host vehicle, the frequency bin at which the peak is detected is higher in the UP spectrum than in the DN spectrum. This is based on the characteristics of the FMCW in which the magnitude relationship between the frequency detected in the up chirp and the frequency detected in the down chirp changes due to the Doppler shift. However, in a case where the relative speed between the reflection point and the host vehicle is zero, the peak of the 2FCW cannot be detected because the peak is buried in low frequency noise. Therefore, it is not possible to match the peak of the 2FCW with the peak of the FMCW. In this case, the matching is performed only within the FMCW, that is, between the peak of the UP spectrum and the peak of the DN spectrum.

Hereinafter, the peak on the XX spectrum is referred to as an XX peak. In this case, XX represents any of MF-FFT, UP-FFT, DN-FFT, MF, UP, and DN.

Then, the instantaneous value when both the UP peak and the DN peak corresponding to the MF peak are extracted is represented by (MF, UP, DN). Also, the instantaneous value when only the UP peak corresponding to the MF peak is extracted is represented by (MF, UP), and the instantaneous value when only the DN peak corresponding to the MF peak is extracted is represented by (MF, DN).

Furthermore, pair matching using a known method in the FMCW radar is also performed using the UP peak and the DN peak without using the MF peak. The instantaneous value extracted by this pair matching is represented by (UP, DN).

In the following S190, the processing unit 70 performs tracking using the instantaneous value generated in S180. In the tracking, from a target object and a target object candidate (hereinafter referred to as target object members) detected in the previous processing cycle, the distance and direction (hereinafter, prediction position) in which the target object member is predicted to be detected in the current processing cycle is calculated. In addition, the distance and direction (hereinafter, detection position) of the reflection point (hereinafter, peak corresponding point) represented by the instantaneous value are calculated from the instantaneous value. Then, when the difference between the prediction position and the detection position is within the preset allowable range, a historical connection is executed to associate the target object member and the instantaneous value with the reflection from the same object. When the instantaneous value cannot be associated with any target object, it is assumed that the instantaneous value is one newly detected and has no historical connection. Thus, the instantaneous value is set to a new target object candidate. In addition, the target object candidate is recognized as a formal target object when the historical connection is confirmed over a predetermined number of the processing cycles.

In the following S200, the processing unit 70 assigns a virtual image flag F to each of the target object members generated in S190, to initialize the virtual image flag. Specifically, all virtual image flags F are set to off, which indicates that the target object member is not a virtual image (that is, it is a real image).

In the following S210, the processing unit 70 determines whether or not the surrounding environment in which the host vehicle is traveling is a folding environment. The folding environment is an environment in which ambiguity may occur in the distance calculated from the instantaneous value. Specifically, the folding environment is an environment surrounded by walls, such as inside a tunnel. The determination of whether or not the surrounding environment is the folding environment may be performed by analyzing the signal obtained by the radar. Alternatively, instead of the signal obtained by the radar, for example, an image captured by an in-vehicle camera may be used, or the position information and map information of the host vehicle may be used for the determination. Moreover, the determination may be made using these information in combination. When it is determined that that the surrounding environment is the folding environment, the processing unit 70 shifts the processing to S220. When it is determined that the environment is not the folding environment, the processing unit 70 shifts the processing to S230.

In S220, the processing unit 70 executes a virtual image determination processing to determine whether or not each of the target object members is a virtual image and to update the virtual image flag. Then, the processing unit 70 shifts the processing to S230.

In S230, the processing unit 70 generates an estimation value (x, y. Vx. Vy) regarding the target object detected by the tracking in S190, and outputs the estimation value (x, y. Vx. Vy) to the driving assist ECU 100 via the output unit 80. Thus, the processing unit 70 ends the processing. The estimated value may include the virtual image flag F.

In the driving assist ECU 100, when the estimation value includes the virtual image flag F, for example, the virtual image flag may be used as alarm on/off information. Thus, the estimation value in which the virtual image flag F is set to ON (that is, the target object) may be excluded from the target to alarm. The virtual image flag F can be used not only for alarms but also for various other controls.

[1-2-2. Feature Quantity, Real Image Distribution, Virtual Image Distribution]

Before explaining a virtual image determination processing executed by the processing unit 70 in S220, a feature quantity used for a virtual image determination, a real image distribution, a virtual image distribution, and a virtual image appearance probability will be described.

The feature quantity is obtained by computing, in combination, information extracted from the MF spectrum, the UP spectrum and the DN spectrum, and information obtained from the MF-FFT spectrum, the UP-FFT spectrum and the DN-FFT spectrum, which are obtained in the process of generating the MF spectrum, the UP spectrum and the DN spectrum. In this case, five feature quantities will be described. Hereinafter, the five feature quantities are referred to as first to fifth feature quantities D1 to D5.

The first feature quantity D1 is calculated when the instantaneous value is (MF, UP, DN) or (UP, DN), that is, when the instantaneous value includes both the UP peak and the DN peak. Specifically, the first feature quantity D1 is the value calculated using an equation (1), in which Pdd is the peak level of the DN peak, and Pfu is the peak level of the UP-FFT peak corresponding to the UP peak.

$$D1 = Pdd - Pfu \tag{1}$$

The first feature quantity D1 is a feature quantity for realizing a determination using the following facts. That is, if the peak corresponding point specified by the instantaneous value is a real image, there is a high probability that the peak level Pdd after the directional development will be equal to or lower than the peak level Pfu before the directional development. On the other hand, if the peak corresponding point is a virtual image, the probability that the magnitude relationship will be reversed is higher than that of the real image.

The second to fifth feature quantities D2 to D5 are calculated for all the target object members.

In regard to the second feature quantity D2, as shown in the equation (2), Pfu, which is the peak level of the UP-FFT peak corresponding to the UP peak, is defined as the second feature quantity D2.

$$D2 = Pfu \tag{2}$$

In regard to the third feature quantity D3, as shown in the equation (3), Pfd, which is the peak level of the DN-FFT peak corresponding to the DN peak, is defined as the third feature quantity D3.

$$D3 = Pfd \tag{3}$$

That is, the second feature quantity D2 and the third feature quantity D3 are feature quantities for realizing determination using the fact that the peak levels of the UP-FFT peak and the DN-FFT peak tend to be higher when the peak corresponding point is a real image than when the peal corresponding point is a virtual image.

The fourth feature quantity D4 is the lateral position x of the target object member. The lateral position x is a position in the vehicle width direction of the host vehicle, and is represented so that a lateral position directly behind the radar device 10 in the rear direction of the vehicle is 0 m. Although the direction θ in which the target object member is located may be used instead of the lateral position x, the lateral position x is suitable for expressing the real image distribution and the virtual image distribution, which will be described later, in a normal distribution.

Figure 5:
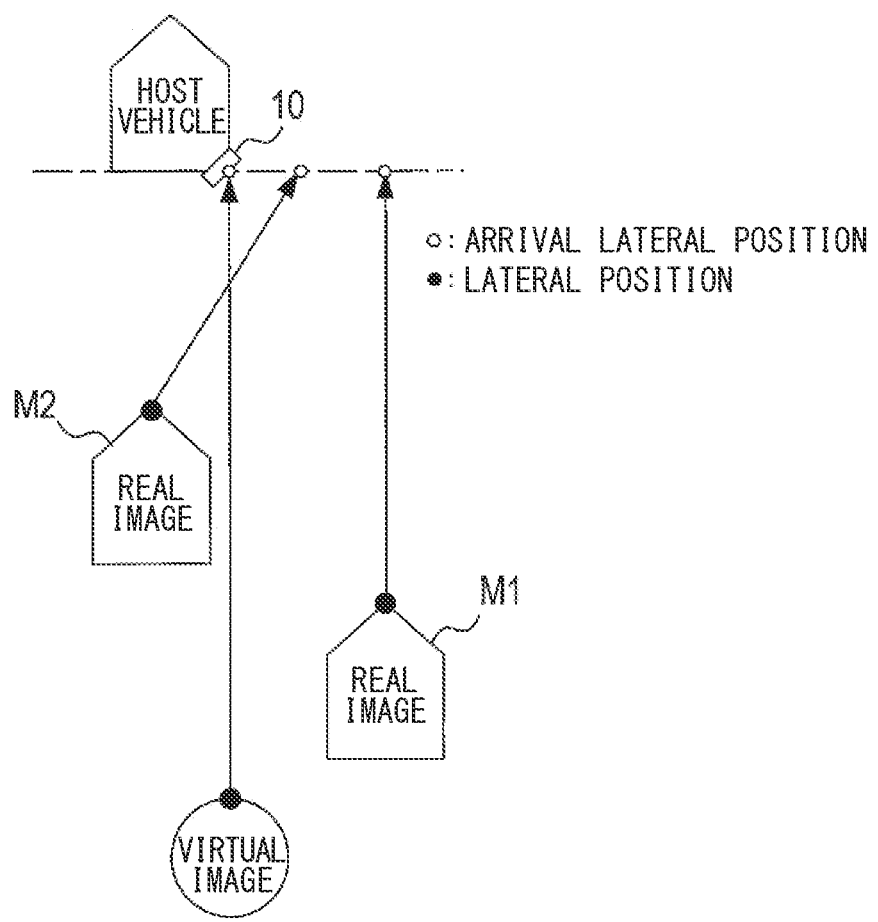
FIG. 5 is an explanatory diagram showing a lateral position as a third feature quantity and an arrival lateral position as a fourth feature quantity.

The fourth feature quantity D4 is a feature quantity for realizing a determination using the following facts. That is, as shown in FIG. 5, the entity that is the source of the virtual image is likely to exist farther than the upper limit distance, and to be detected directly behind the radar device 10, that is, in the vicinity of the lateral position of 0 m. On the other hand, a vehicle M1 to be noted as a target of an alarm or the like is likely to be traveling in an adjacent lane.

The fifth feature quantity D5 is an arrival lateral position of the target object member. The arrival lateral position is a predicted lateral position when the target object member reaches the rear end of the host vehicle, which is estimated from the longitudinal position, the lateral position, the moving speed, and the moving direction of the target object member. The longitudinal position is the position of the target object member in the vehicle longitudinal direction of the host vehicle.

The fifth feature quantity D5 is a feature quantity for realizing a determination using the following facts. That is, as shown in FIG. 5, in the case of a virtual image, the arrival lateral position is about 0 m in the lateral position. On the other hand, there is a high possibility that a vehicle M1 traveling in the adjacent lane and trying to overtake the host vehicle and a vehicle M2 trying to change the lane have arrival lateral positions away from the lateral position of 0 m.

When the feature quantity Di, in which i=1 to 5, is given, the real image distribution is obtained by indicating in the normal distribution the probability that the peak corresponding point from which the feature quantity Di is extracted is the real image (hereinafter referred to as the real image probability).

The virtual image distribution is obtained by indicating in the normal distribution the probability that the peak corresponding point from which the feature quantity Di is extracted is a virtual image (hereinafter, virtual image probability), when the feature quantity Di is given.

The real image appearance probability P (R) is the probability that the real image appears in all the target object members, and the virtual image appearance probability P (I) is the probability that the virtual image appears in all the target object members.

The real image distribution, the virtual image distribution, the real image appearance probability P (R), and the virtual image appearance probability P (I) are generated in advance by learning and stored in the memory 72 of the processing unit 70.

In the learning, first, an instantaneous value is generated from the measurement result obtained by operating the radar device 10 while traveling inside and outside the tunnel, and a target object member is generated by tracking using the generated instantaneous values. Then, each of the feature quantities D1 to D3 is calculated for the peak power of each of the FFT peaks estimated from the generated instantaneous value and the target object members. Further, the feature quantities D1 to D3 with teacher data indicating the correct answer as to whether the target object member having the historical connection with the peak power of each FFT peak estimated from the instantaneous value or the target object member is a real image or a virtual image are accumulated. Furthermore, the feature quantities D4 and D5 are calculated for each of the generated target object member. The feature quantities D4 and D5 with teacher data indicating the correct answer as to whether the target object member is a real image or a virtual image are accumulated.

Figure 6:
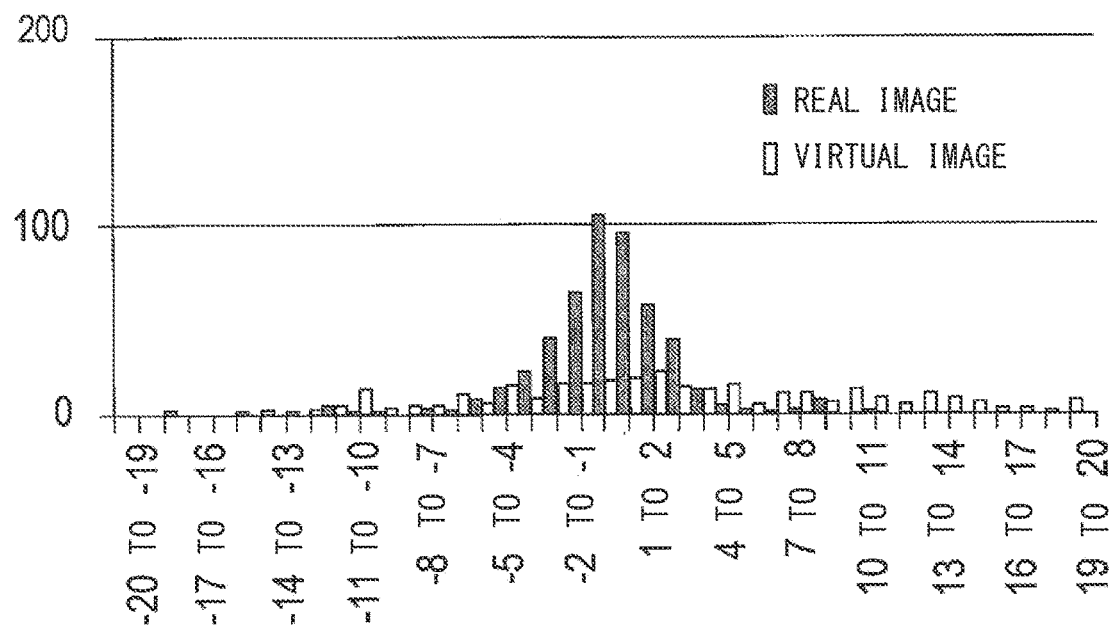
FIG. 6 is an explanatory diagram relating to the generation of a real image distribution and a virtual image distribution.
Figure 6:
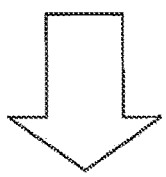
Figure 6:
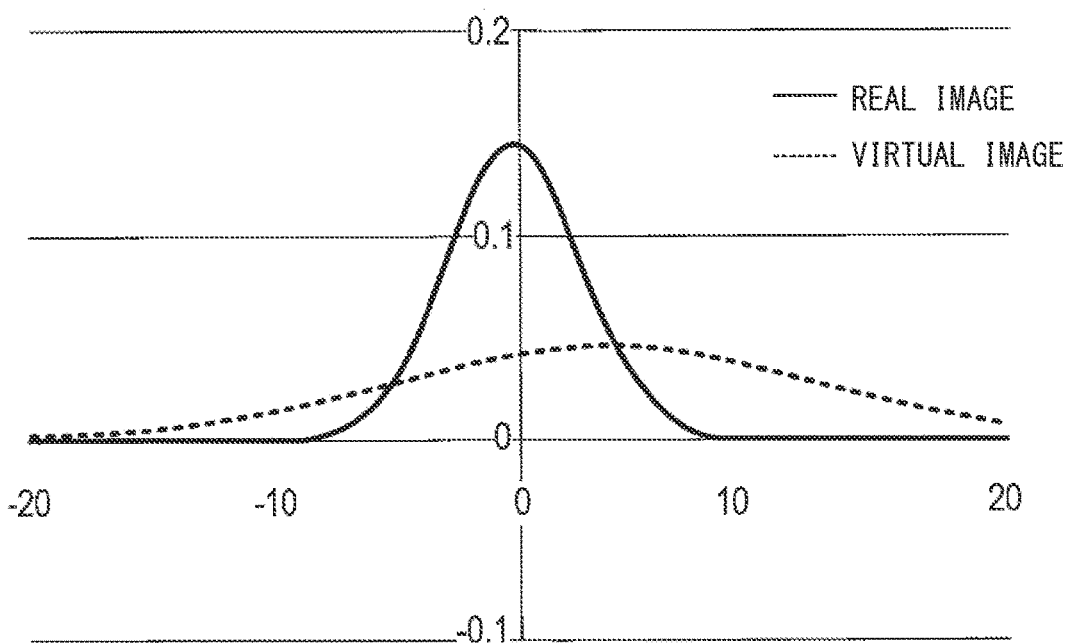
Figure 7:
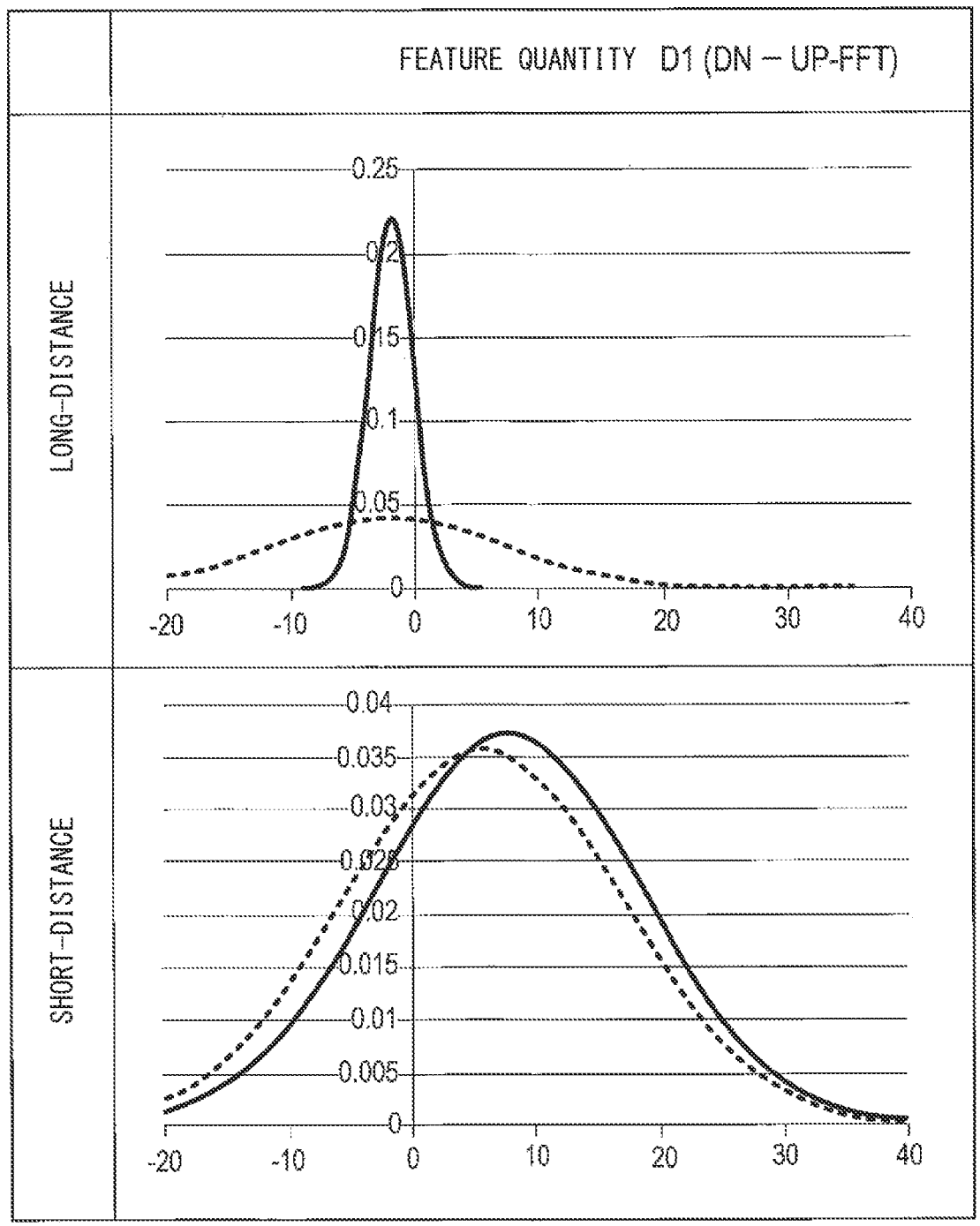
FIG. 7 is a graph showing a real image distribution and a virtual image distribution of the first feature quantity for a long distance and a short distance.
Figure 8:
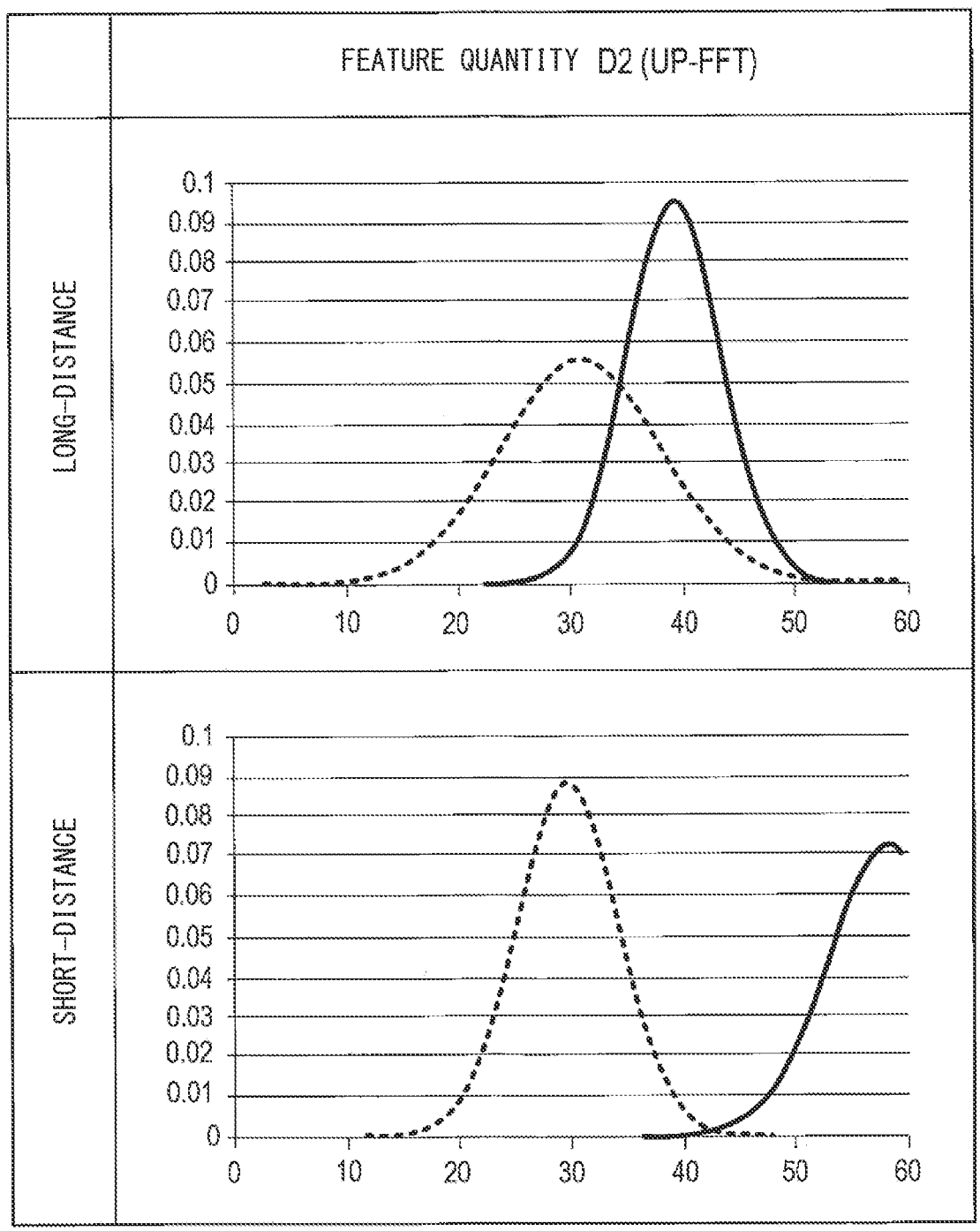
FIG. 8 is a graph showing a real image distribution and a virtual image distribution of the second feature quantity for a long distance and a short distance.
Figure 9:
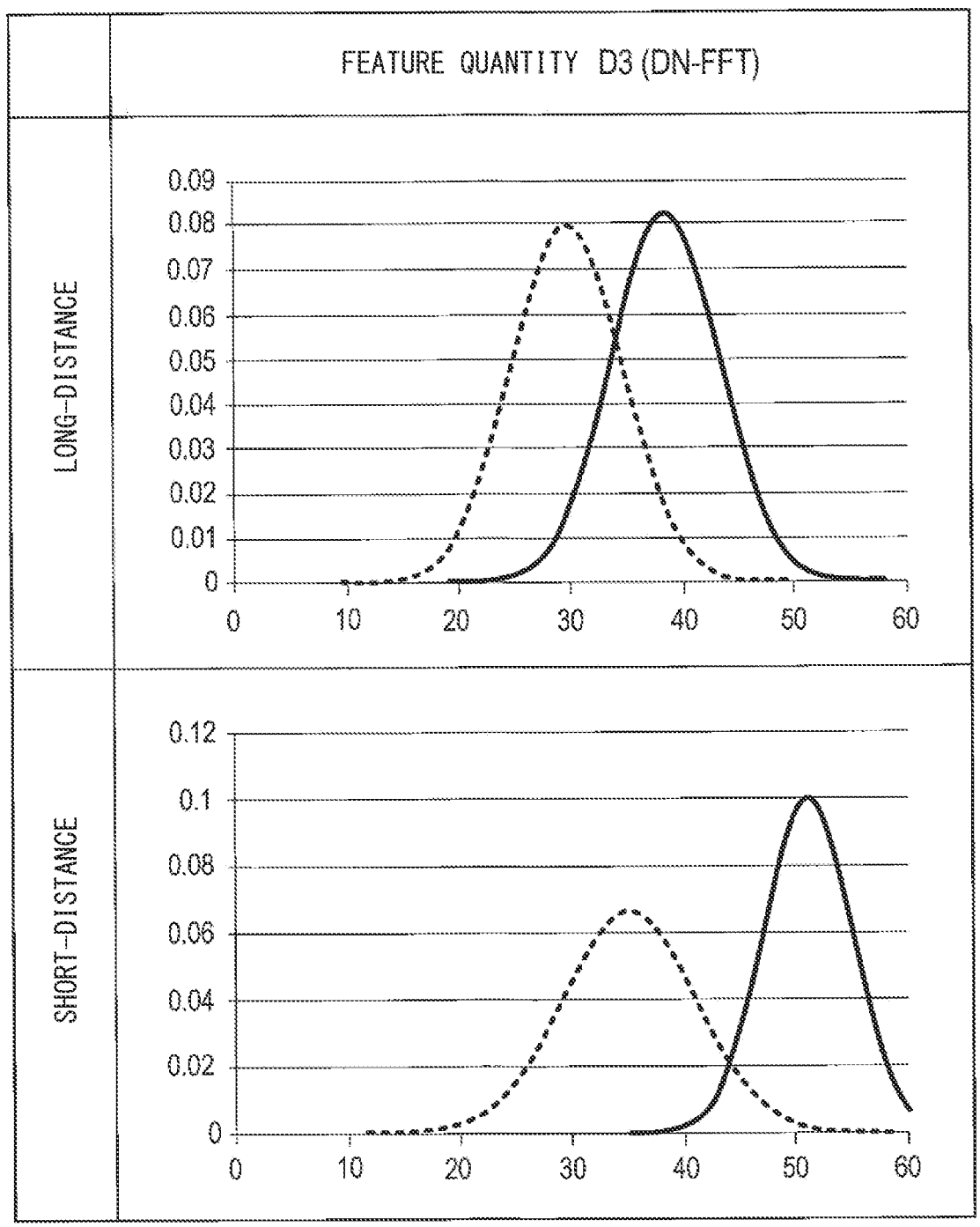
FIG. 9 is a graph showing a real image distribution and a virtual image distribution of the third feature quantity for a long distance and a short distance.
Figure 10:
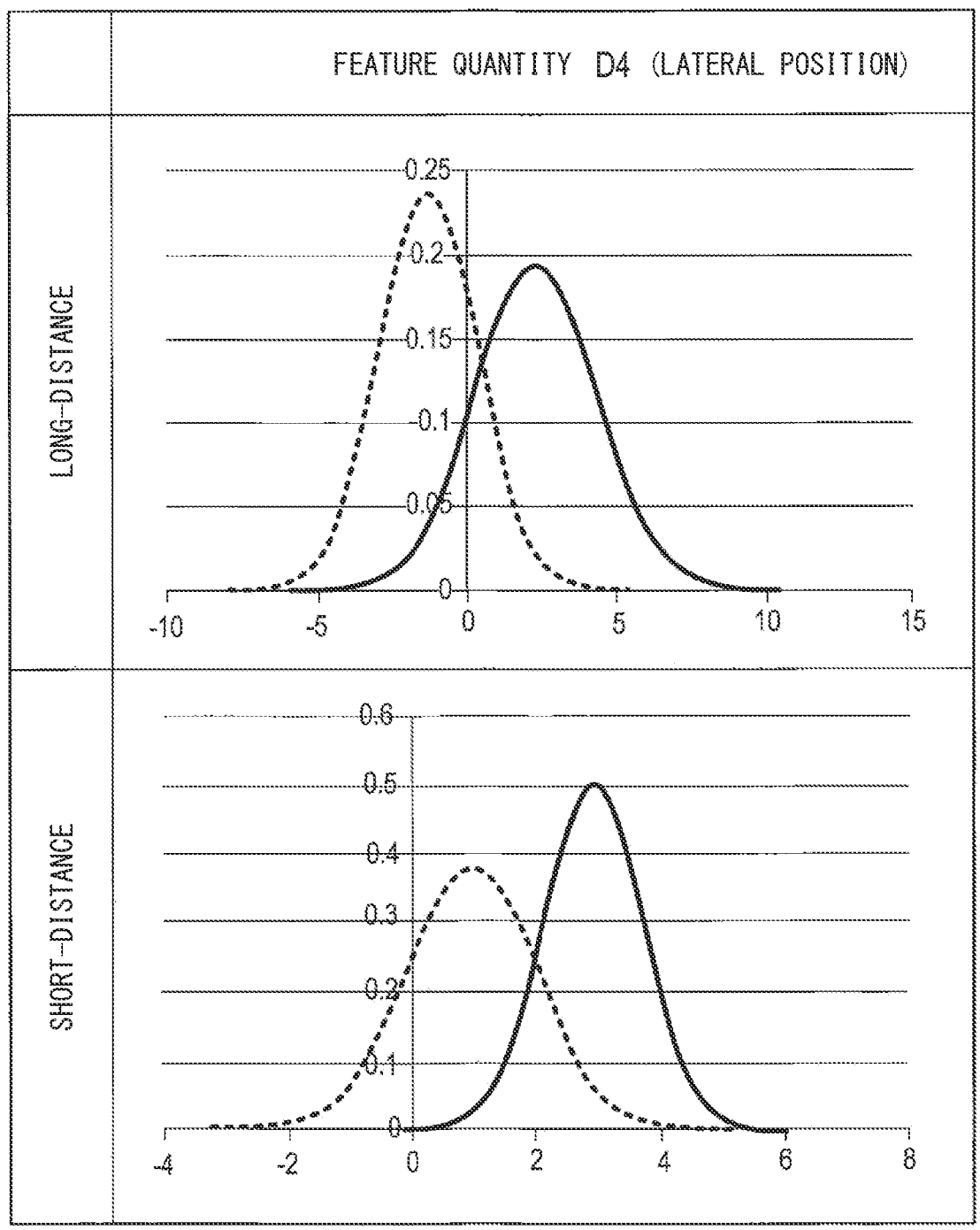
FIG. 10 is a graph showing a real image distribution and a virtual image distribution of the fourth feature quantity for a long distance and a short distance.
Figure 11:
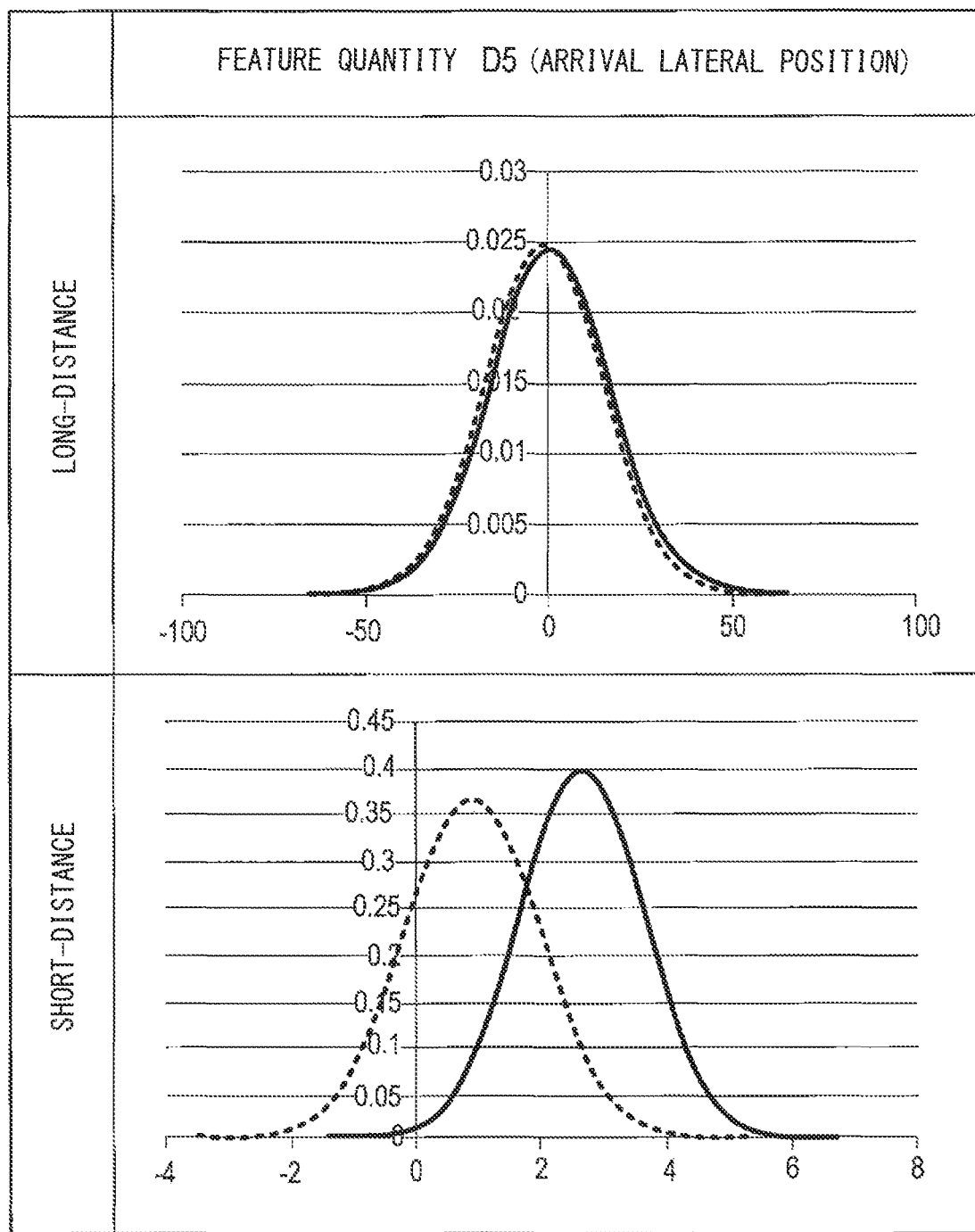
FIG. 11 is a graph showing a real image distribution and a virtual image distribution of the fifth feature quantity.

Using the feature quantities D1 to D5 with the teacher data accumulated in this way, as shown in FIG. 6, a histogram of the feature quantity Di representing a real image and a feature quantity Di representing a virtual image are generated for each feature quantity Di. Further, the real image distribution is generated by converting the histogram representing the real image into a normal distribution, and the virtual image distribution is generated by converting the histogram representing the virtual image into a normal distribution. The real image appearance probability P (R) and the virtual image appearance probability P (I) are calculated using the data obtained in the above learning.

The real image distribution and the virtual image distribution of each of the feature quantities D1 to D5 are illustrated in FIGS. 7 to 11. In the following, the real image probability when the feature quantity Di is given is represented by P (Di|R), and the virtual image probability when the feature quantity Di is represented by P (Di|I). In the distribution of the feature quantity D1, the horizontal axis represents a signal strength indicating the peak level of the difference. In the distributions of the feature quantities D2 and D3, the horizontal axis represents a signal strength indicating the peak level. In the distribution of the feature quantities D4 and D5, the horizontal axis represents the lateral position x. Each of the real image distribution and the virtual image distribution is separately prepared for a long distance and a short distance, and is stored in the memory 72.

[1-2-3. Virtual Image Determination Processing]

Figure 12:
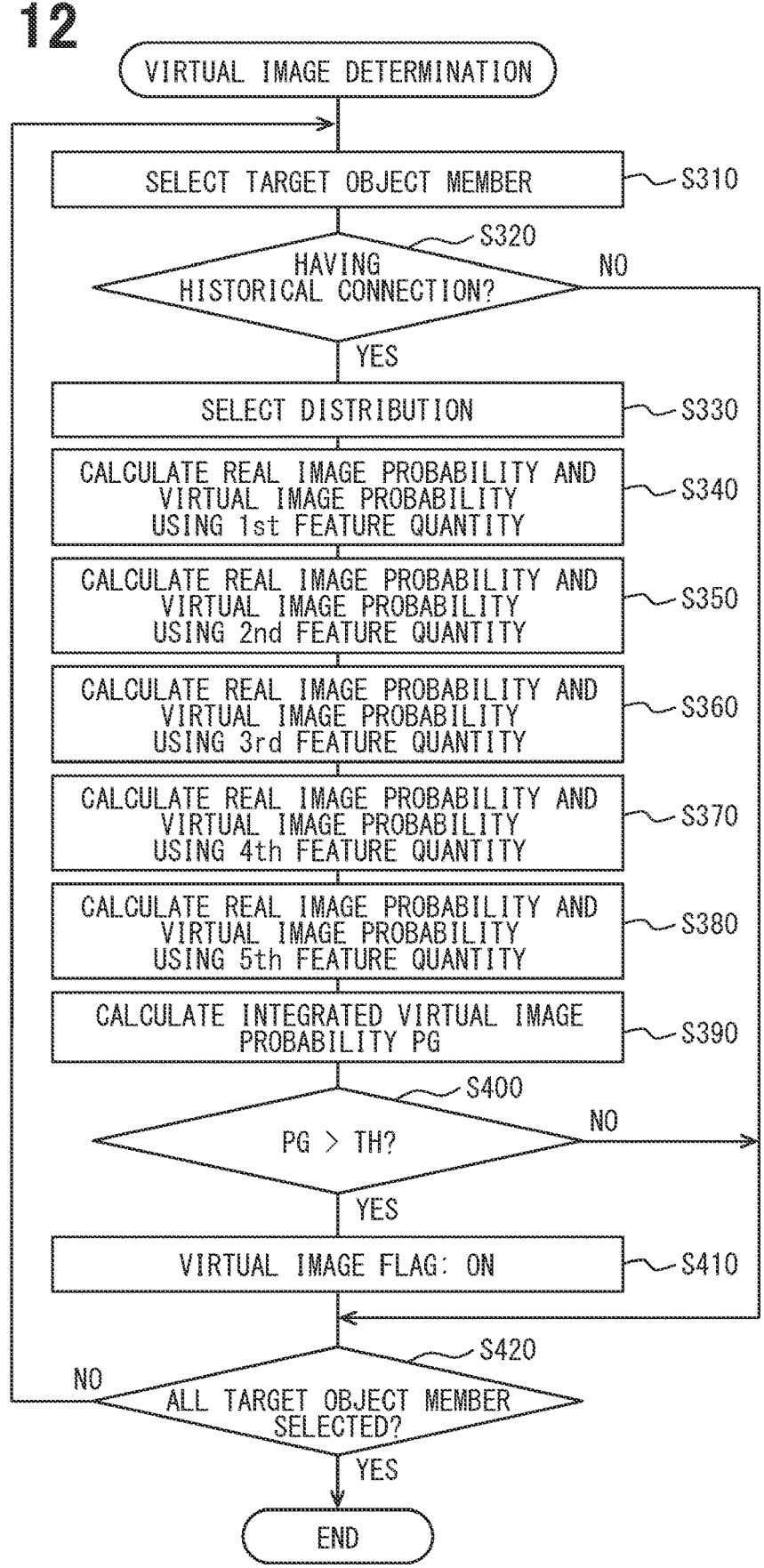
FIG. 12 is a flowchart of a virtual image determination processing according to a first embodiment.

A virtual image determination processing executed by the processing unit 70 will be described with reference to the flowchart of FIG. 12.

In S310, the processing unit 70 selects a target object member that has not been processed in S320 to S410, among the target object members extracted in S180. Hereinafter, the target object member selected will be referred to as a selected target object member.

In the following 320, it is determined whether or not there is an instantaneous value (hereinafter, connection instantaneous value) for which the historical connection with the selected target is confirmed by the tracking processing of S190. When the determination result in S320 is an affirmative determination, the processing unit 70 shifts the processing to S330. When the determination result in S320 is a negative determination, the processing unit 70 shifts the processing to S420.

In S330, the processing unit 70 selects either a long-distance distribution or a short-distance distribution according to the distance calculated for the selected target object member. For example, if the distance is within 50 m, the short-distance distribution is selected, and if the distance exceeds 50 m, the long-distance distribution is selected. In the following processing of S340 to S380, the real image distribution and the virtual image distribution selected in S330 are used.

In the following S340, the processing unit 70 calculates the first feature quantity D1 for the connection instantaneous value of the selected target object member, and calculates the real image probability P (D1|R) and the virtual image probability P (D1|I) based on the calculated first feature quantity D1 and the real image distribution and the virtual image distribution of the first feature quantity D1.

In the following S350, the processing unit 70 calculates the second feature quantity D2 for the connection instantaneous value of the selected target object member. Further, the processing unit 70 calculates the real image probability P (D2|R) and the virtual image probability P (D2|I), based on the calculated second feature quantity D2 and the real image distribution and virtual image distribution of the second feature quantity D2.

In the following S360, the processing unit 70 calculates the third feature quantity D3 for the connection instantaneous value of the selected target object member. Further, the processing unit 70 calculates the real image probability P (D3|R) and the virtual image probability P (D3|I), based on the calculated third feature quantity D3 and the real image distribution and virtual image distribution of the third feature quantity D3.

In the following S370, the processing unit 70 calculates the fourth feature quantity D4 for the selected target object member, and calculates the real image probability P (D4|R) and virtual image probability P (D4|I), based on the calculated fourth feature quantity D4 and the real image distribution and the virtual image distribution of the fourth feature quantity D4.

In the following S380, the processing unit 70 calculates the fifth feature quantity D5 for the selected target object member, and calculates the real image probability P(D5|R) and virtual image probability P (D5|I), based on the calculated fifth feature quantity D5 and the real image distribution and the virtual image distribution of the first feature quantity D5.

In the following S390, the processing unit 70 calculates the integrated virtual image probability PG according to the equations (4) to (6). In these equations, assuming that the real image probability and the virtual image probability are independent events, the probability that the selected target object member is a virtual image is calculated using Naive Bayes to which Bayesian inference is applied.

$$PG=P(I) \times P(D|I)/(P(D|I)P(D|R)) \quad (4)$$

$$P(D|I)=P(D1|I) \times P(D2|I) \times P(D3|I) \times P(D4|I) \times P(D5|I) \quad (5)$$

$$P(D|R)=P(D1|R) \times P(D2|R) \times P(D3|R) \times P(D4|R) \times P(D5|R) \quad (6)$$

The equation (5) represents a synthesized virtual image probability in which virtual image probabilities of all the feature quantities are synthesized, and the equation (6) represents a synthesized real image probability in which real image probabilities of all the feature quantities are synthesized. However, equations (7) and (8) may be used in place of the equations (5) and (6) to reduce the amount of calculation and to suppress the digit loss on the software.

$$P(D|I)=\exp(\log P(D|I))\log P(D|I)=\log P(D1|I)+\log P(D2|I)+\log P(D3|I)+\log P(D4|I)+\log P(D5|I) \quad (7)$$

$$P(D|R)=\exp(\log P(D|R))\log P(D|R)=\log P(D1|R)+\log P(D2|R)+\log P(D3|R)+\log P(D4R)+\log P(D5|R) \quad (8)$$

In the following S400, the processing unit 70 determines whether or not the integrated virtual image probability PG of the selected target object member calculated in S390 is larger than a preset threshold value TH. If the integrated virtual image probability PG is larger than the threshold value TH, the processing unit 70 shifts the processing to S410. If the integrated virtual image probability PG is equal to or less than the threshold value TH, the processing unit 70 shifts the processing to S420.

In S410, the processing unit 70 updates the virtual image flag F assigned to the selected target object to ON, and shifts the processing to S420.

In S420, the processing unit 70 determines whether or not all the target object members have been selected in S310. If there is a target object member that has not been selected, the processing unit 70 shifts the processing to S310. If all the target object members have been selected, the processing unit 70 ends the processing.

[1-3. Effects]

According to the embodiment described hereinabove in detail, the following effects are achieved.

(1a) The radar device 10 generates two-dimensional spectra developed with respect to distance and direction from the FMCW-type up-chirp and down-chirp, and the 2FCW-type received signal, and generate an instantaneous value by matching the peaks on these two-dimensional spectra. Further, the radar device 10 generates a target object member by performing tracking using the instantaneous value, and determines whether or not the generated target object member is a virtual image by using the integrated virtual image probability PG. The integrated virtual image probability PG is the value calculated by integrating the real image probability (Di|R) and the virtual image probability P (Di|I) for each of the feature quantities D1 to D3 extracted from the instantaneous values and the feature quantities D4 and D5 extracted from the target object members. Therefore, in the radar device 10, it is possible to suppress erroneous detection of a target object due to peak mismatching or the like when generating the instantaneous values. As a result, it is possible to suppress erroneous operation of driving assist control based on erroneous detection.

(1b) The radar device 10 uses a naive Bayesian method in which each event is assumed to be independent when integrating the real image probability P (Di|R) and the virtual image probability P (Di|I). Therefore, the feature quantity Di can be easily added or deleted, and the accuracy of the virtual image determination can be adjusted as appropriate.

2. Second Embodiment

[2-1. Difference from the First Embodiment]

Since the basic configuration of a second embodiment is similar to the first embodiment, the difference will be described hereinafter. Note that the same reference numerals as those in the first embodiment indicate the same configuration, and refer to the preceding descriptions.

In the first embodiment described above, the integrated virtual image probability PG is used for determining the virtual image. On the other hand, the second embodiment is different from the first embodiment in that the logbayes ratio is used. That is, the contents of the virtual image determination processing are partially different.

[2-2. Processing]

Figure 13:
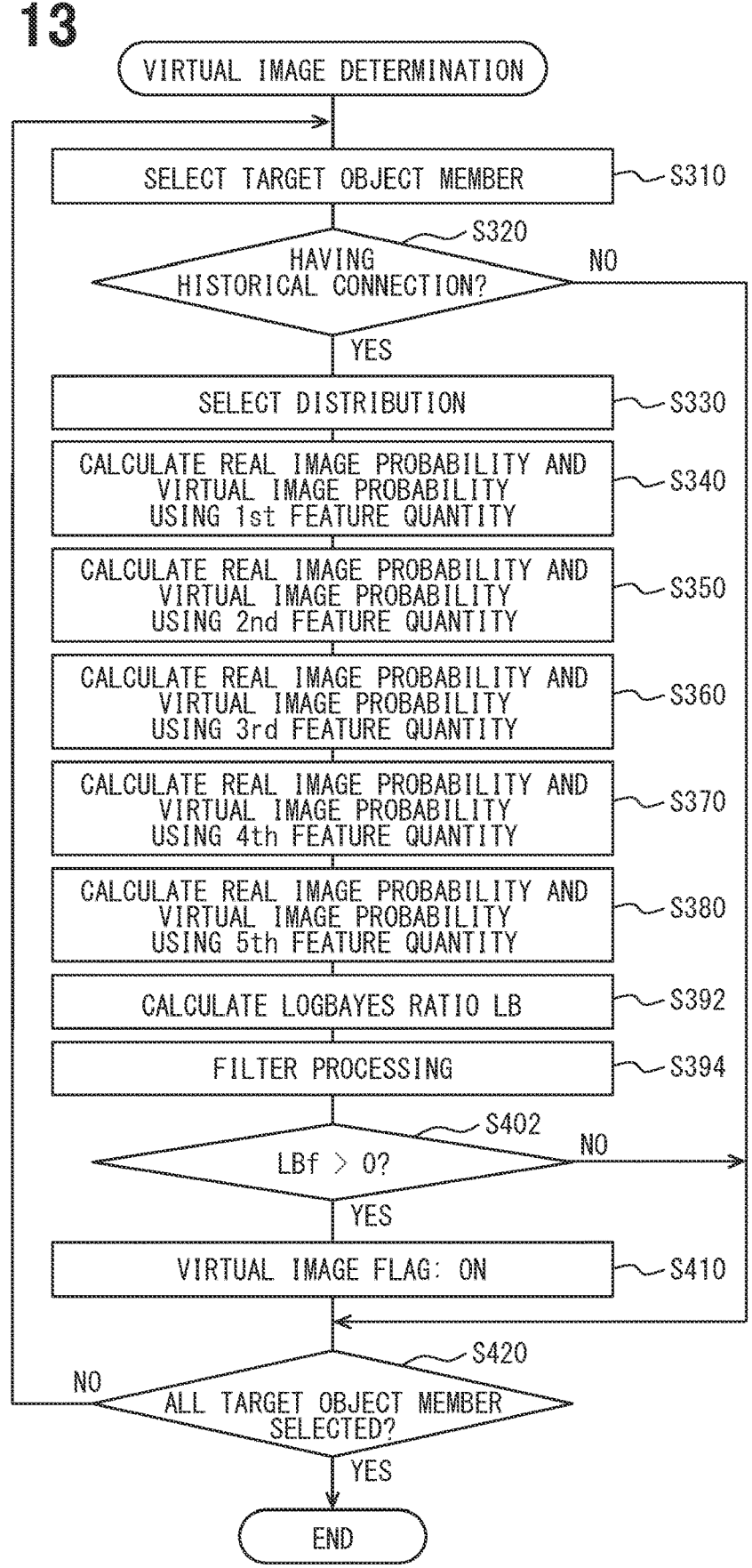
FIG. 13 is a flowchart of a virtual image determination processing according to a second embodiment.

A virtual image determination processing of the second embodiment executed by a processing unit 70, in place of the virtual image determination processing of the first embodiment shown in FIG. 12, will be described with reference to the flowchart of FIG. 13. Since the processing of S310 to S380 and S410 to S420 are the same as the processing of the first embodiment, the description thereof will be omitted.

In S392 following S380, the processing unit 70 calculates the logbayes ratio LB according to equations (9) and (10). However, log P (D|I) and log P (D|R) are calculated using the equations (7) and (8) described above.

$$LB=TH+\log P(D|I)-\log P(D|R) \quad (9)$$

$$TH=\log P(I)-\log P(R)+A \quad (10)$$

In the equation (10), A is a constant set experimentally and may be 0. TH is a threshold value, and is set so that a target object member can be determined as a virtual image when LB is a positive value, and as a real image when LB is a negative value.

In the following S394, the processing unit 70 executes a filter processing for suppressing a sudden change in the value of the logbayes ratio LB. The logbayes ratio calculated in S392 is expressed as LB [n], the logbayes ratio after the filter processing is expressed as LBf [n], and the logbayes ratio after the filter processing calculated in the previous processing cycle is expressed as LBf [n−1]. The coefficient α is a real number with 0<α≤1. In the filter processing, an operation shown in the equation (11) is executed. The logbayes ratio LBf [n] after the filter processing is also simply referred to as the logbayes ratio LBf.

$$LBf[n]=\alpha \times LB[n]+(1-\alpha)LBf[n-1] \quad (11)$$

In the following S402, the processing unit 70 determines whether or not the logbayes ratio LBf of the selected target object member calculated in S394 is greater than 0. If the logbayes ratio LBf is larger than 0, the selected target object member is regarded as a virtual image and the processing is shifted to S410. If the logbayes ratio LBf is equal to or less than 0, the selected target object member is regarded as a real image and the processing is shifted to S420.

[2-3. Operation Example]

Figure 14:
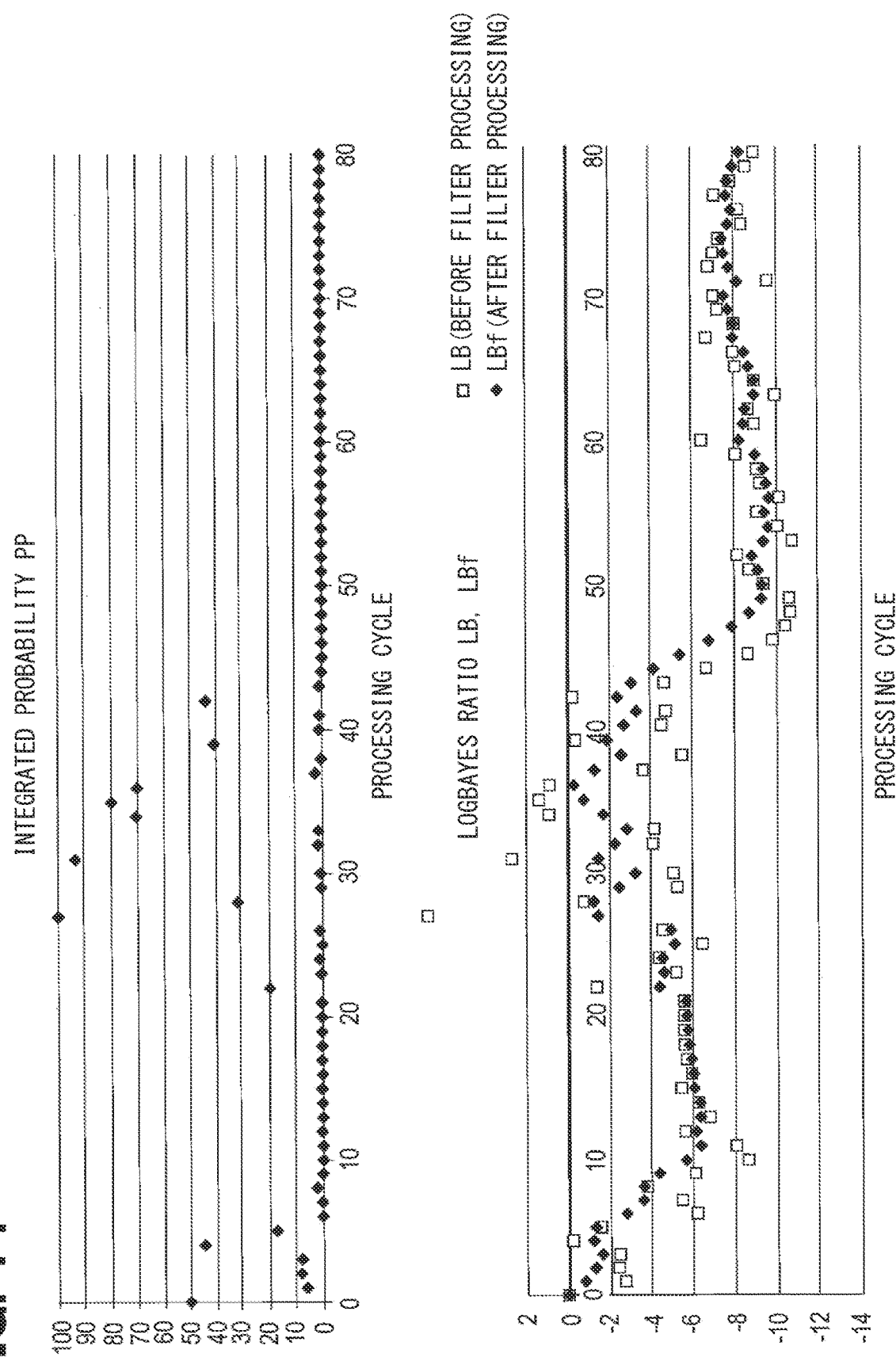
FIG. 14 is a graph plotting integrated virtual image probabilities calculated for each processing cycle when a target object member to be processed is a real image and logbayes ratios before and after a filter processing for each processing cycle.
Figure 15:
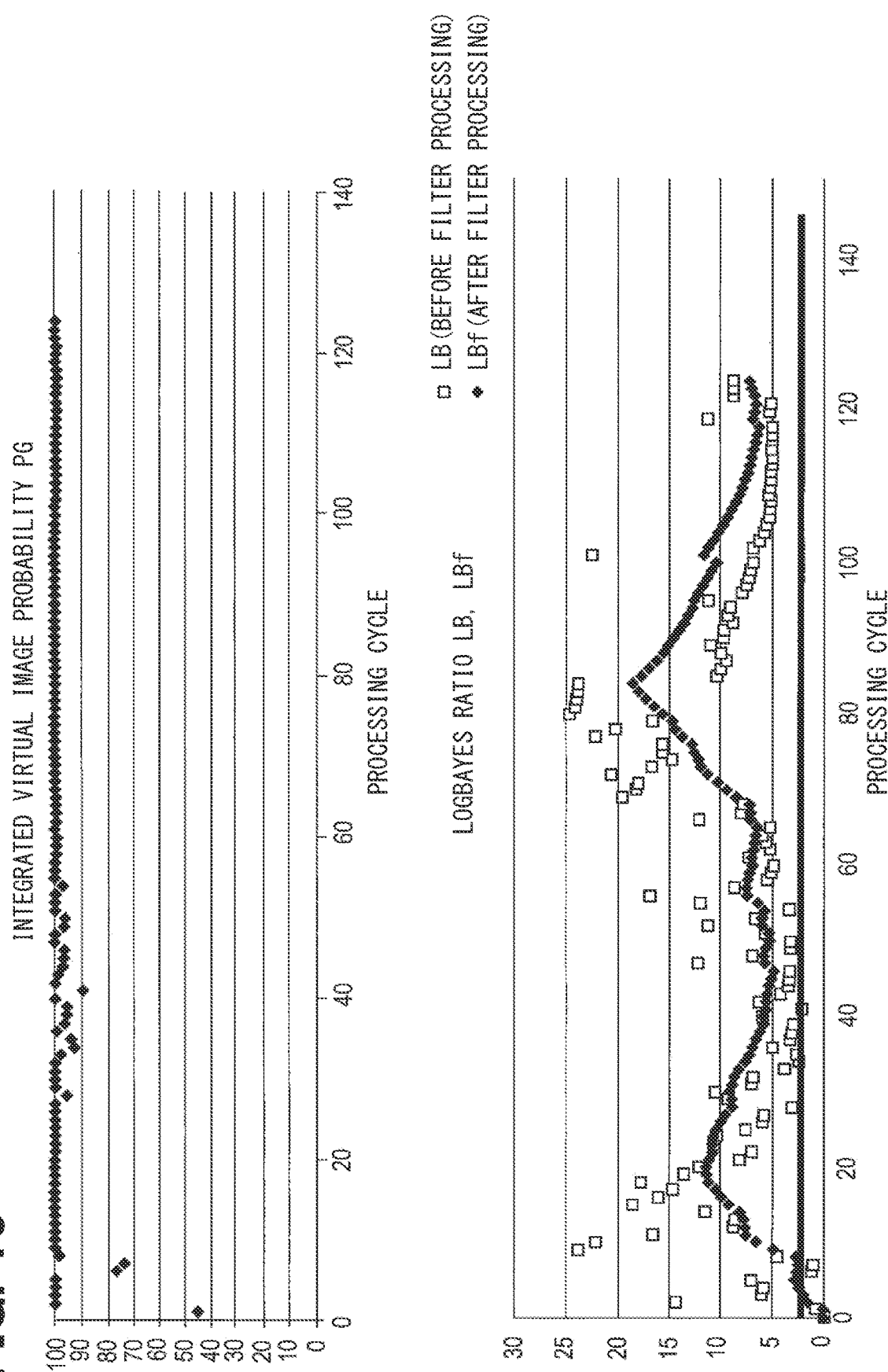
FIG. 15 is a graph plotting integrated virtual image probabilities calculated for each processing cycle when a target object member to be processed is a virtual image and logbayes ratios before and after a filter processing for each processing cycle.

In FIGS. 14 and 15, upper graphs show the ghost probability PG calculated by the equation (4), and lower graphs show the results of plotting the logbayes ratio LBf calculated by the equation (9) and before the filter processing and the logbayes ratio LBf calculated by the equation (11) and after the filter processing for every processing cycle. Note that FIG. 14 shows a case where the target object member to be processed is a real image, and FIG. 15 shows a case where the target object member to be processed is a virtual image.

As shown in FIG. 14, in the 25th processing cycle, the ghost probability PG is a large value exceeding 50% and the logbayes ratio LB is a positive value due to the disturbance even though the target object member is a real image. That is, when it is determined whether or not the target object member is a virtual image using the ghost probability PG or the logbayes ratio LB before the filter processing, an erroneous determination result may be obtained. On the other hand, the logbayes ratio LBf after the filter processing remains a negative value, and the determination result can be correctly obtained.

The threshold value TH can be changed by adjusting the parameter A in the equation (10). For example, when the parameter A is set to zero (A=0), the probability of erroneously determining a real image as a virtual image and the probability of erroneously determining a virtual image as a real image are equal. However, in reality, it is more likely problematic that the system does not operate by erroneously determining the real image as a virtual image than by erroneously determining the ghost as a real image and operating the system in vain. Therefore, by setting A>0, that is, by shifting the threshold value TH to the positive side in FIG. 14, the probability of erroneously determining a real image as a virtual image may be further reduced.

[2-4. Effects]

The second embodiment described above achieves the effects (1a) and (1b) of the first embodiment described above as well as the following effects.

(2a) The logbayes ratio LBf is calculated by performing the filter processing in which the logbayes ratio LB [n] before the filter processing obtained in the current processing cycle and the logbayes ratio LBf [n−1] after the filter processing obtained in the previous processing cycle are combined using the coefficient α. Therefore, even if the abnormal logbayes ratio LB [n] is suddenly calculated due to the disturbance, the virtual image determination does not immediately follow, and a stable determination result can be obtained.

(2b) By using the logbayes ratio LBf, the amount of calculation can be further reduced as compared with the case where the integrated virtual image probability PG is used.

(2c) The threshold value TH is incorporated in the calculation of the logbayes ratio LB, and the threshold value TH can be easily adjusted.

3. Other Embodiments

While the embodiments of the present disclosure have been described hereinabove, the present disclosure is not limited to the embodiments described hereinabove and can be implemented by variously modifying as exemplified hereinafter.

(3a) In the embodiment described above, the first to fifth feature quantities D1 to D5 are used as the feature quantities used for calculating the logbayes ratio LB. The feature quantities may be any feature quantities that cause a clear difference between the real image distribution and the virtual image distribution. Further, the number of the feature quantities used for calculating the integrated virtual image probability PG is not limited to 5, and may be 1 to 4 or 6 or more.

Figure 16:
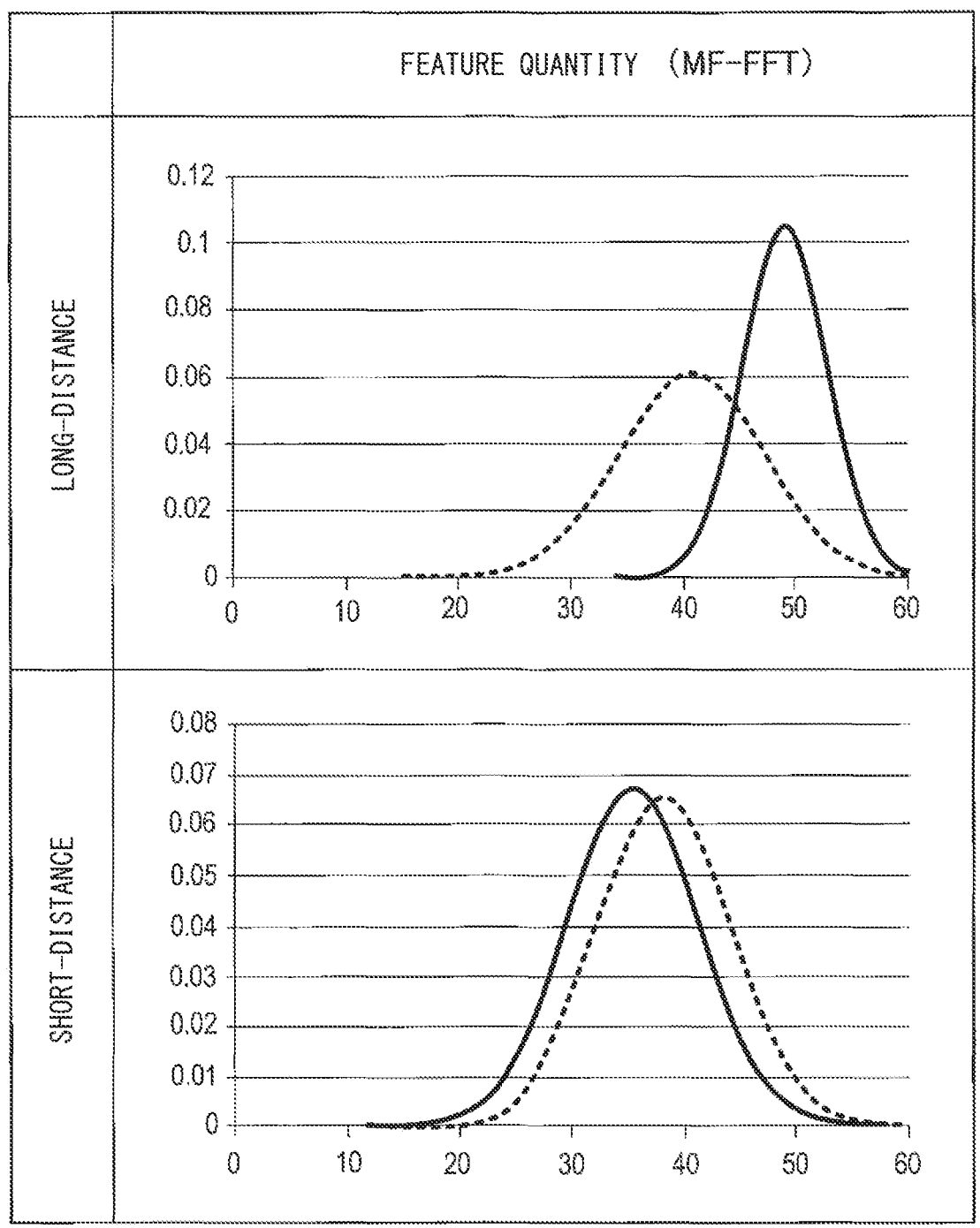
FIG. 16 is a graph showing a real image distribution and a virtual image distribution of another feature quantity for a long distance and a short distance.
Figure 17:
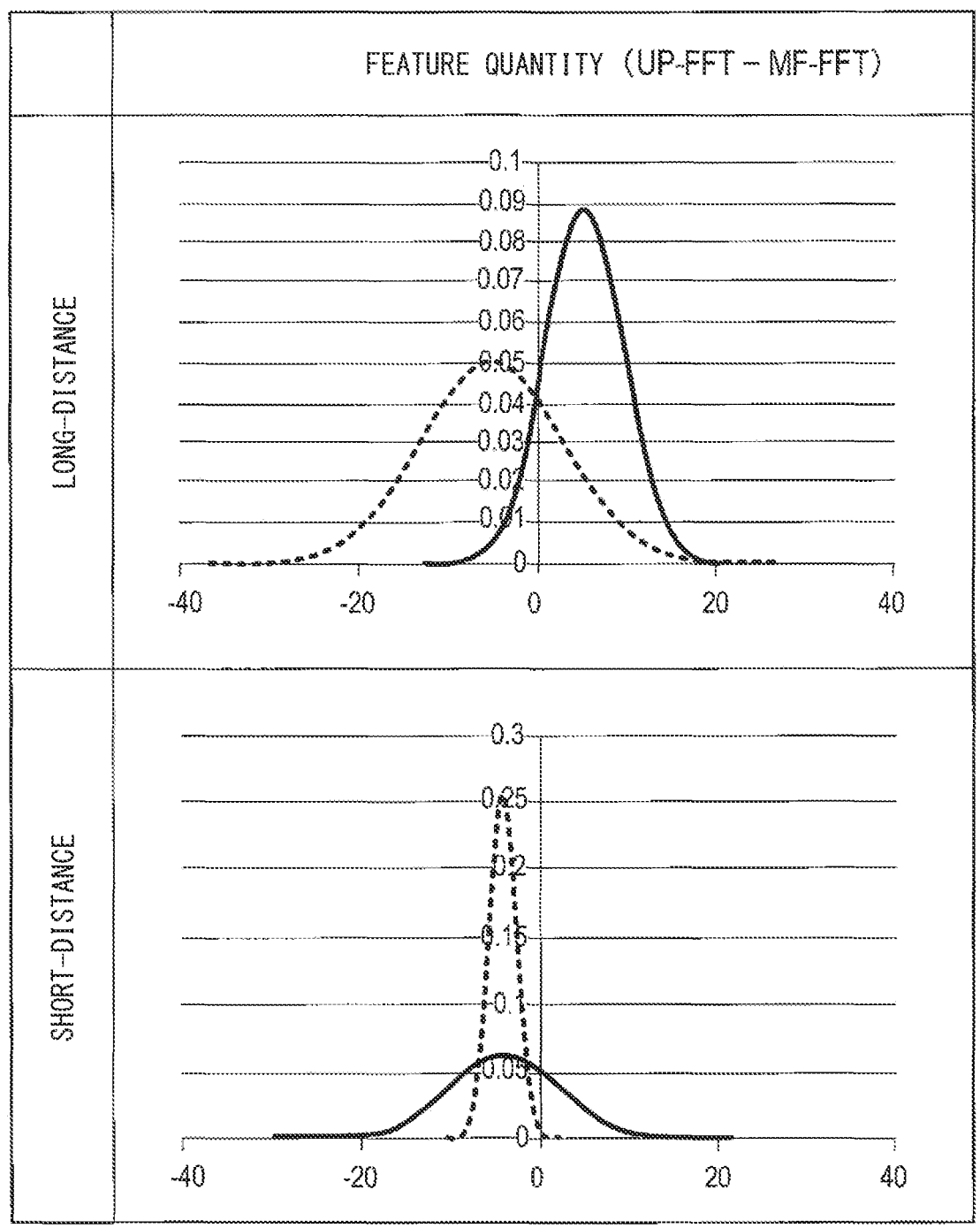
FIG. 17 is a graph showing a real image distribution and a virtual image distribution of another feature quantity for a long distance and a short distance.
Figure 18:
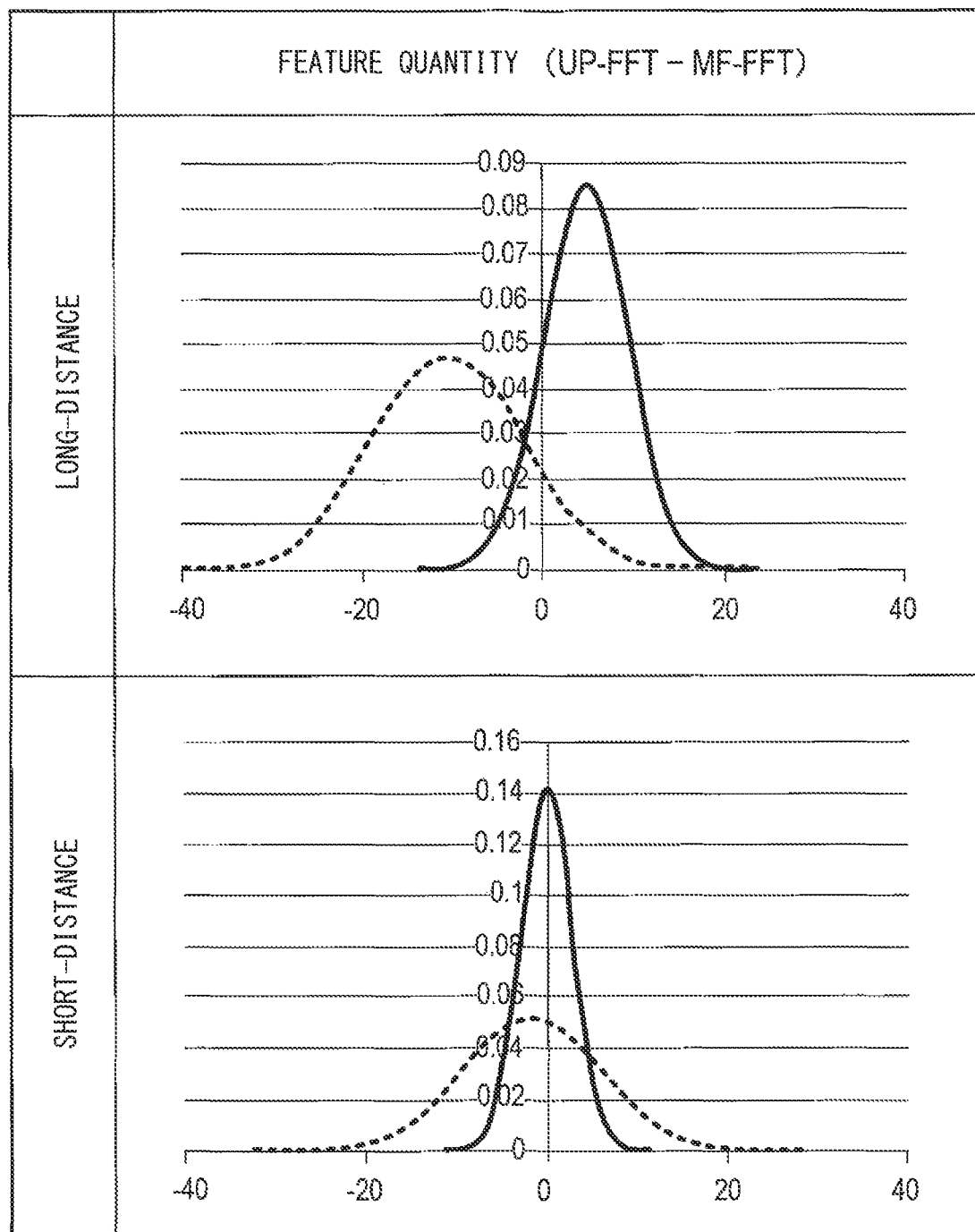
FIG. 18 is a graph showing a real image distribution and a virtual image distribution of another feature quantity for a long distance and a short distance.
Figure 19:
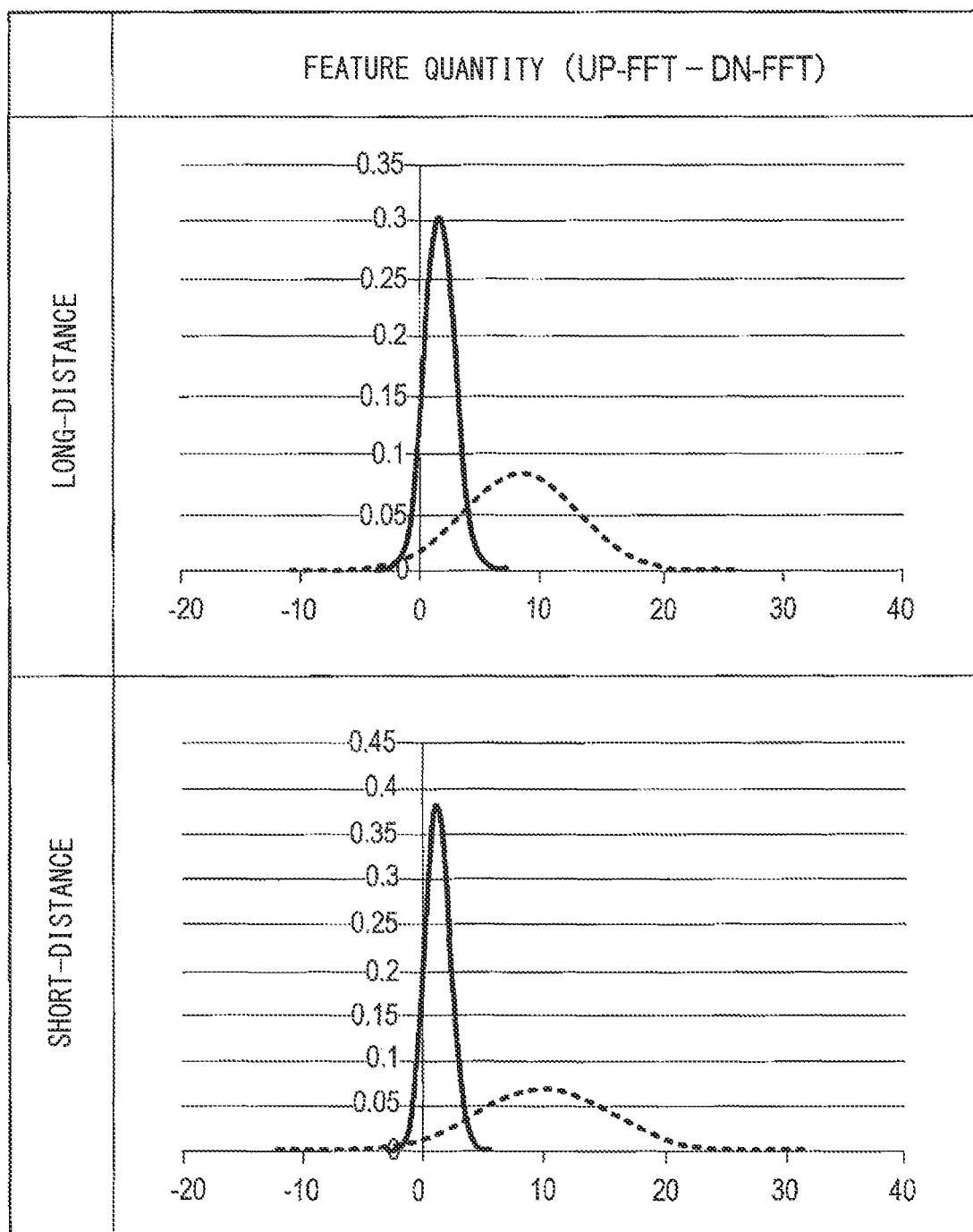
FIG. 19 is a graph showing a real image distribution and a virtual image distribution of another feature quantity for a long distance and a short distance.

For example, as shown in FIG. 16, the peak level of the MF-FFT peak may be used as the feature quantity. As shown in FIG. 17, a value obtained by subtracting the peak level of the MF-FFT peak from the peak level of the UP-FFT peak may be used as the feature quantity. As shown in FIG. 18, a value obtained by subtracting the peak level of the MF-FFT peak from the peak level of the DN-FFT peak may be used as the feature quantity. As shown in FIG. 19, a value obtained by subtracting the peak level of the DN-FFT peak from the peak level of the UP-FFT peak may be used as the feature quantity.

Figure 20:
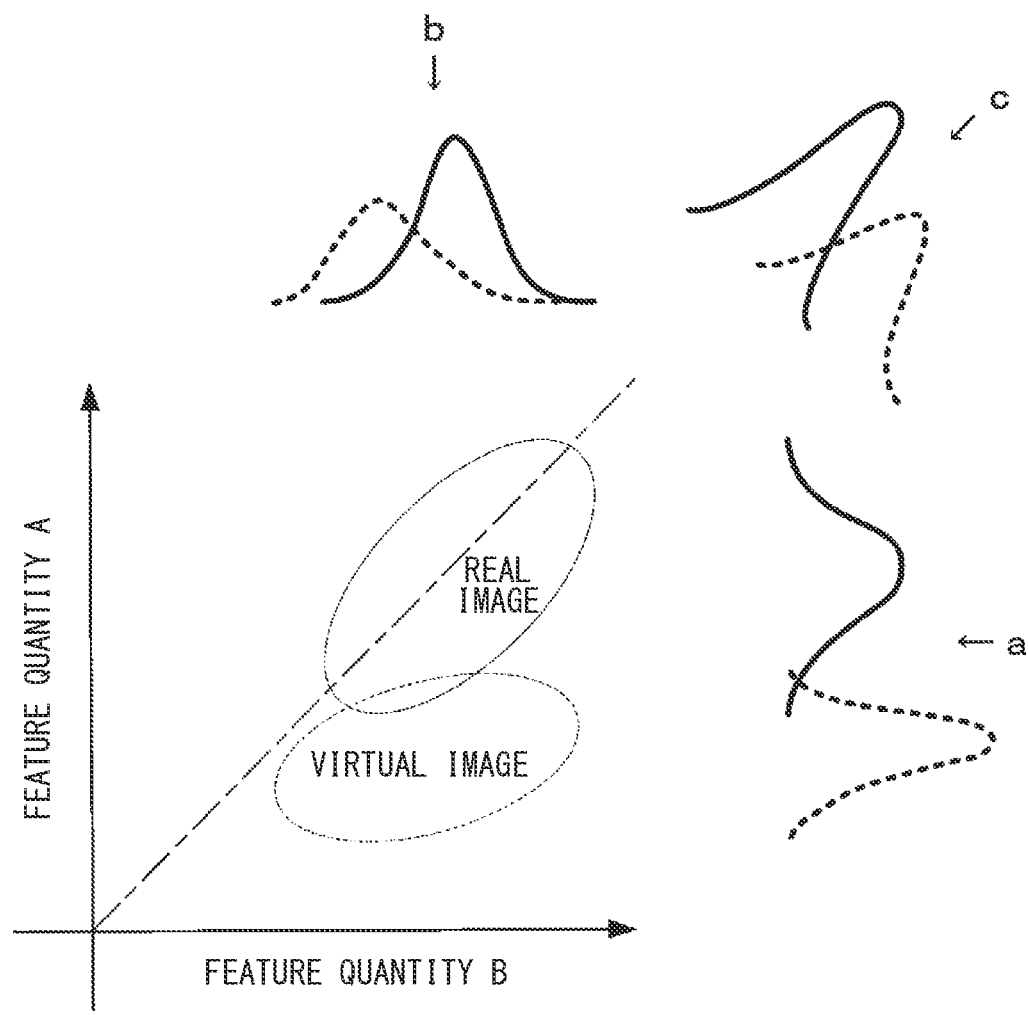
FIG. 20 is an explanatory diagram showing distributions relative to two types of feature quantities in cases where a target object member is a real image and where a target object member is a virtual image, and showing that the shapes of the real image distribution and the virtual image distribution are different depending on how the feature quantities are set.

In a case where the real image and the virtual image are distributed with respect to the two feature quantities A and B as shown in FIG. 20, when the feature quantity A is used alone, the real image distribution and the virtual image distribution shown by a in FIG. 20 can be obtained. When the feature quantity B is used alone, the real image distribution and the virtual image distribution shown by b in FIG. 20 can be obtained. Further, in a case where the difference between the two feature quantities is used, the real image distribution and the virtual image distribution shown by c in FIG. 20 can be obtained. In other words, by performing the calculation between the feature quantities, even if the distributions are the same, it is possible to cut out the distribution from the viewpoint that the difference between the two feature quantities becomes clearer. Therefore, the feature quantities may be set in consideration of such a viewpoint.

(3b) In the embodiment described hereinabove, the case where the distance detected by the radar device has the ambiguity has been described. However, the present disclosure may be applied to a case where the speed or the direction has ambiguity.

(3c) In the embodiment described hereinabove, the 2FCW is used as the second modulation. In the present disclosure, however, the second modulation is not limited to the 2FCW. As the second modulation, any other radar methods such as a FCM having ambiguity in the measurement result may be used as the second modulation.

(3d) In the embodiment described hereinabove, the FMCW is used as the first modulation. In the present disclosure, however, the first modulation is not limited to the FMCW, and any other radar methods may be used as the first modulation as long as the first modulation is different from the second modulation. Further, in the embodiment described hereinabove, the case where two types of radar methods are combined. Alternatively, three or more types of radar methods may be combined.

(3e) In the embodiment described hereinabove, the instantaneous value is generated by matching the peaks detected from each of the up chirp and the down chirp of the FMCW and the 2FCW. However, the present disclosure is not limited to this example. For example, the present disclosure may be applied to a radar device in which the up chirp of the FMCW is regarded as the first modulation and the down chirp of the FMCW is regarded as the second modulation, and only the peaks detected from both chirps may be matched to generate the instantaneous value.

(3f) In the embodiment described hereinabove, the instantaneous value is generated from the result of matching in which the peaks extracted by each of the plurality of modulation methods are matched. Alternatively, the instantaneous value may be generated by the peak extracted from the single modulation method, without performing the matching with other peaks.

(3g) In the embodiment described hereinabove, the real image distribution and the virtual image distribution are prepared for the long distance and for the short distance, for each of the feature quantities. However, the present disclosure is not limited to such an example. For example, only one real image distribution and only one virtual image distribution may be prepared for each feature quantity without dividing by distance. Further, the distance may be further subdivided, and three or more real image distributions and three or more virtual image distributions may be prepared for each feature quantity.

(3h) In the embodiment described hereinabove, when the log probabilities log P (D|R) and log P (D|I) are obtained using the equations (7) and (8), the values tend to be very small. However, the finally calculated integrated virtual image probability PG is obtained by the ratio of these values. Therefore, the maximum value of log P (Di|R) and log P (Di|I) may be set as MAX, and the result of subtracting the maximum value from each may be used as the log probability.

(3i) A plurality of functions possessed by one component in the embodiment described above may be realized by a plurality of components, or one function possessed by one component may be realized by a plurality of components. Further, a plurality of functions possessed by the plurality of components may be realized by one component, or one function realized by the plurality of components may be realized by one component. A part of the configuration of the embodiment described above may be omitted. At least a part of the configuration of the above embodiments may be added to or replaced with the configuration of another one of the embodiments described above.

(3j) In addition to the radar device described hereinabove, the present disclosure can be realized in various forms, such as a system having the radar device as a component, a program for operating a computer as the radar device, a non-transitory tangible storage medium, such as a semiconductor memory, storing the program, and a method for determining the virtual image.

The invention claimed is:

1. A radar device comprising:
a spectrum generation unit configured to analyze signals that are obtained by transmitting and receiving modulated waves, as radar waves, by using two or more types of modulation methods in every processing cycle, and to generate at least one of a one-dimensional spectrum having a frequency as a coordinate axis or a two-dimensional spectrum having a frequency and a direction as coordinate axes for each modulation method;
an instantaneous value generation unit configured to extract at least one combination of peaks that are estimated to be based on a same target object from a plurality of spectra generated by the spectrum generation unit, and to generate for each combination of the peaks, an instantaneous value including a distance and a direction obtained from information included in the peaks of the combination;
a connection determination unit configured to generate and extinguish a target object and a target object candidate by determining whether or not a target object and a target object candidate generated in a previous processing cycle have a historical connection with the instantaneous value generated by the instantaneous value generation unit;
a feature quantity extraction unit configured to extract, for each connection instantaneous value that is the instantaneous value to which the historical connection with the target object or the target object candidate, as a target object member, is confirmed by the connection determination unit, one or more types of feature quantities determined in advance by using at least one of information associated with the connection instantaneous value or information associated with the target object member;
a distribution storage unit storing a virtual image distribution and a real image distribution generated in advance for each feature quantity; and
a virtual image determination unit configured to calculate, using an extraction result of the feature quantity extraction unit relating to the target object member, a virtual image probability from the virtual image distribution and a real image probability from the real image distribution for each target object member generated by the connection determination unit, and to determine whether or not each target object member is a virtual image according to a result of integrating the virtual image probability and the real image probability calculated,
wherein
the virtual image distribution is a distribution, when the feature quantity is given, representing a probability that an extraction source of the given feature quantity is a virtual image,
the real image distribution is a distribution representing, when the feature quantity is given, a probability that an extraction source of the given feature quantity is a real image, and
as the feature quantity, one having the virtual image distribution and the real image distribution being different in shape is used.

2. The radar device according to claim 1, wherein
the two or more types of modulation methods include at least a FMCW modulation, and
the spectrum generation unit generates the two-dimensional spectrum having the frequency and the direction as the coordinate axes for each of an up chirp and a down chirp in the FMCW modulation as different modulation methods.

3. The radar device according to claim 2, wherein
the spectrum generation unit is configured to generate an UP-FFT spectrum which is the one-dimensional spectrum of the up chirp, a DN-FFT spectrum which is the one-dimensional spectrum of the down chirp, an UP spectrum which is the two-dimensional spectrum of the up chirp, and a DN spectrum which is the two-dimensional spectrum of the down chirp,
the UP-FFT spectrum and the DN-FFT spectrum are spectra in which frequency bins correspond to a distance and a relative velocity, and are calculated by executing FFT for each of the up chirp and the down chirp, and the UP spectrum and the DN spectrum are spectra calculated by executing directional-development of the UP-FFT spectrum and the DN-FFT spectrum for each frequency bin.

4. The radar device according to claim 3, wherein the instantaneous value generated by the instantaneous value generation unit includes at least a peak on the DN spectrum and a peak on the UP spectrum, and the feature quantity extraction unit extracts, as one of the feature quantities, a value obtained by subtracting a signal level of a peak on the UP-FFT spectrum corresponding to the peak on the UP spectrum from a signal level of the peak on the DN spectrum.

5. The radar device according to claim 3, wherein the instantaneous value generated by the instantaneous value generation unit includes at least a peak on the UP spectrum, and the feature quantity extraction unit extracts, as one of the feature quantities, a signal level of the peak on the UP spectrum.

6. The radar device according to claim 3, wherein the instantaneous value generated by the instantaneous value generation unit includes at least a peak on the DN spectrum, and the feature quantity extraction unit extracts, as one of the feature quantities, a signal level of the peak on the DN spectrum.

7. The radar device according to claim 1, wherein the radar device is mounted on a mobile body, and a position in a direction orthogonal to a direction in which the mobile body travels straight is referred to as a lateral position, and the feature quantity extraction unit extracts, as one of the feature quantities, the lateral position of the target object member.

8. The radar device according to claim 7, wherein the lateral position of the target object member at a time of the target object member reaching the mobile body estimated from a moving direction and a moving speed of the target object member is referred to as an arrival lateral position, and the feature quantity extraction unit extracts, as one of the feature quantities, the arrival lateral position of the target object member.

9. The radar device according to claim 1, wherein a plurality of the feature quantities are used, the target object member of interest is referred to as an interested target object member, and the virtual image determination unit is configured to determine whether or not the interested target object member is a virtual image by using an integrated virtual image probability that is obtained by integrating the virtual image probability and the real image probability calculated for each feature quantity associated with the interested target object member using Naive Bayes.

10. The radar device according to claim 1, wherein a plurality of the feature quantities are used, the target object member of interest is referred to as an interested target object member, the virtual image determination unit is configured to determine whether or not the interested target object member is a virtual image by using a Bayes ratio, which is a ratio of a synthetic virtual image probability to a synthetic real image probability, the synthetic virtual image probability is calculated by synthesizing the virtual image probabilities for all the feature quantities associated with the interested target object member, and the synthetic real image probability is calculated by synthesizing the real image probabilities for all the feature quantities associated with the interested target object member.

11. The radar device according to claim 10, wherein the virtual image determination unit is configured to perform a filter processing on the Bayes ratio to suppress a sudden change in the value, and to determine whether or not the interested target object member is a virtual image by using the Bayes ratio after the filter processing.

12. The radar device according to claim 1, wherein the distribution storage unit is stored with a plurality of types of the virtual image distribution and real image distribution for each feature quantity in correspondence with a distance to the target object member, and the virtual image determination unit is configured to calculate the virtual image probability and the real image probability by using the virtual image distribution and the real image distribution selected according to a distance to the target object member specified by the instantaneous value.

13. The radar device according to claim 1, wherein the two or more types of modulation methods include at least a modulation in which information having ambiguity due to a phase folding back is detected from a received signal.

14. The radar device according to claim 13, wherein the two or more types of modulation methods include at least a multi-frequency CW modulation or a FCM modulation.

15. A radar device comprising:

a processor and a memory configured to:

analyze signals that are obtained by transmitting and receiving modulated waves, as radar waves, by using two or more types of modulation methods in every processing cycle;

generate at least one of a one-dimensional spectrum having a frequency as a coordinate axis or a two-dimensional spectrum having a frequency and a direction as coordinate axes for each modulation method;

extract at least one combination of peaks that are estimated to be based on a same target object from a plurality of spectra, and to generate for each combination of the peaks, an instantaneous value including a distance and a direction obtained from information included in the peaks of the combination;

generate and extinguish a target object and a target object candidate by determining whether or not a target object and a target object candidate generated in a previous processing cycle or before have a historical connection with the instantaneous value;

extract, for each connection instantaneous value that is the instantaneous value to which the historical connection with the target object or the target object candidate, as a target object member, is confirmed, one or more types of feature quantities determined in advance by using at least one of information associated with the connection instantaneous value or information associated with the target object member;

calculate for each target object member, using an extraction result relating to the target object member, a virtual image probability from a virtual image distribution stored for each feature quantity and a real image probability from a real image distribution stored for each feature quantity; and determine whether or not each target object member is a virtual image according to a result of integrating the virtual image probability and the real image probability calculated, wherein the virtual image distribution is a distribution, when the feature quantity is given, representing a probability that an extraction source of the given feature quantity is a virtual image, the real image distribution is a distribution representing, when the feature quantity is given, a probability that an extraction source of the given feature quantity is a real image, and as the feature quantity, one having the virtual image distribution and the real image distribution being different in shape is used.

* * * * *